(12) United States Patent
Franson et al.

(10) Patent No.: US 7,006,267 B2
(45) Date of Patent: Feb. 28, 2006

(54) TECHNIQUES FOR HIGH FIDELITY QUANTUM TELEPORTATION AND COMPUTING

(75) Inventors: James D. Franson, Ellicott City, MD (US); Michelle M. Donegan, Columbia, MD (US); Michael J. Fitch, Catonsville, MD (US); Bryan C. Jacobs, Sykesville, MD (US); Todd B. Pittman, Catonsville, MD (US)

(73) Assignee: The Johns Hopkins University, Baltimore, MD (US)

( * ) Notice: Subject to any disclaimer, the term of this patent is extended or adjusted under 35 U.S.C. 154(b) by 360 days.

(21) Appl. No.: 10/651,317

(22) Filed: Aug. 28, 2003

(65) Prior Publication Data

US 2004/0109631 A1    Jun. 10, 2004

Related U.S. Application Data

(60) Provisional application No. 60/443,316, filed on Jan. 29, 2003, provisional application No. 60/433,078, filed on Dec. 13, 2002, provisional application No. 60/431,835, filed on Dec. 9, 2002.

(51) Int. Cl.
*G06E 3/00* (2006.01)
(52) U.S. Cl. .................... 359/107; 708/191; 380/278
(58) Field of Classification Search ............... 359/107, 359/108; 708/191, 816, 831; 380/278
See application file for complete search history.

(56) References Cited

U.S. PATENT DOCUMENTS 6,314,189 B1 *   11/2001   Motoyoshi et al. ......... 380/278
2004/0119061 A1 *   6/2004   Wu et al. ..................... 257/9

OTHER PUBLICATIONS

E.Knill, et al., "A scheme for efficient quantum computation with linear optics", Nature, vol. 409, Jan. 2001, pp. 46-52.*
M.Koashi, et al., "Probabilistic manipulation of entangled photons", Physical Review, vol. 63, 030301, 2001.*
T.C.Ralph, et al., "Simple scheme for efficient linear optics quantum gates", Physical Review, vol. 65, 012314, 2001.*

* cited by examiner

*Primary Examiner*—Leonidas Boutsikaris
(74) *Attorney, Agent, or Firm*—Francis A. Cooch

(57) ABSTRACT

Techniques for high fidelity quantum teleportation include receiving an input photon representing a qubit. Ancilla photons are generated in a particular ancilla quantum state chosen to reduce a rate of error below a threshold error rate. The ancilla and the input photon are combined to populate output channels. A number of photons representing logical value 1 are measured in a subset of the output channels. A particular output channel is determined based on the measured number of photons. A teleported photon is obtained at the particular output channel with an error rate below the threshold error rate. These techniques allow the ancilla quantum state to be chosen to minimize the error despite the presence of losses and noise. Quantum logic operations are performed by teleporting two input qubits with the quantum state of the ancilla chosen to produce the desired logical result and reduce the error.

21 Claims, 9 Drawing Sheets

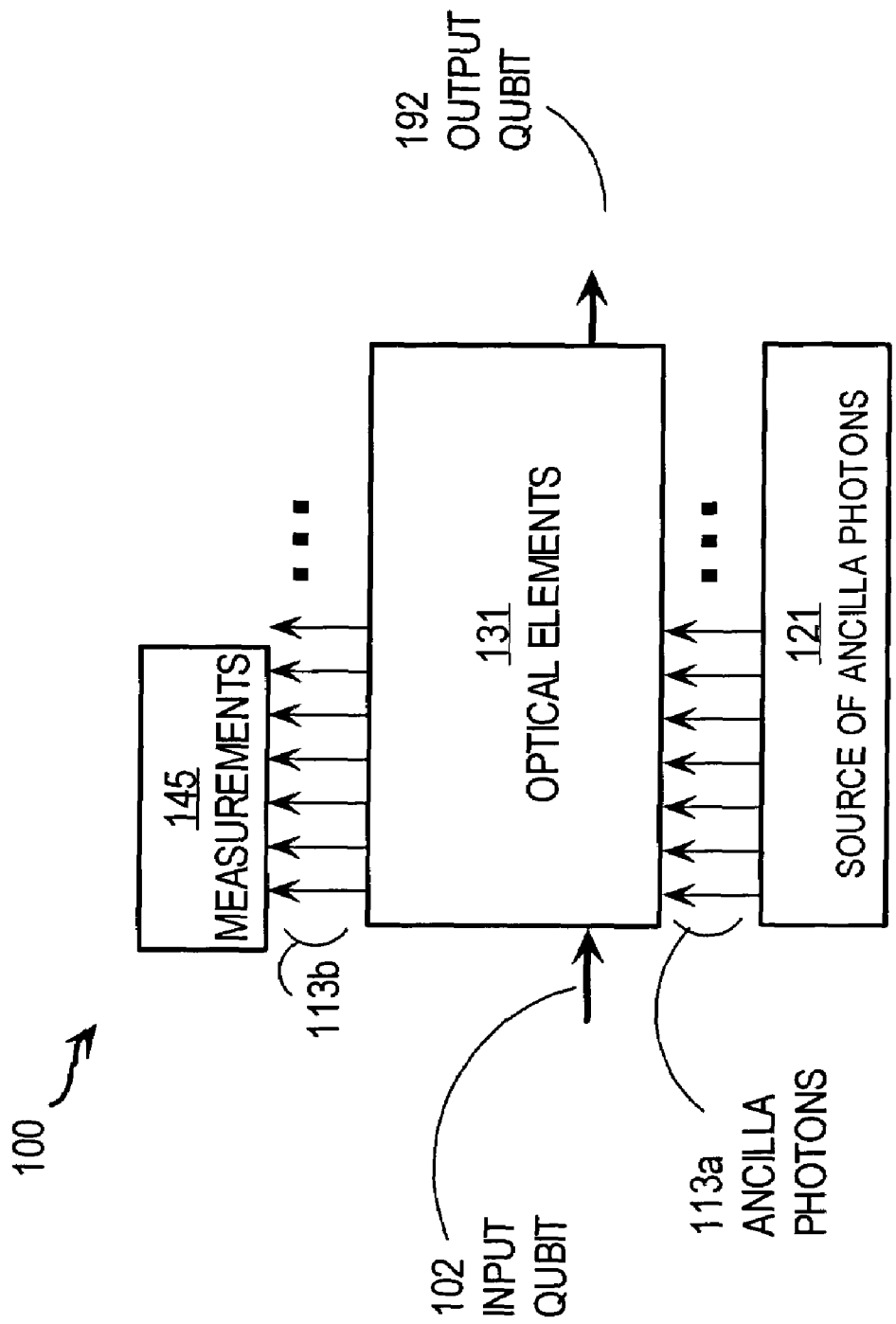

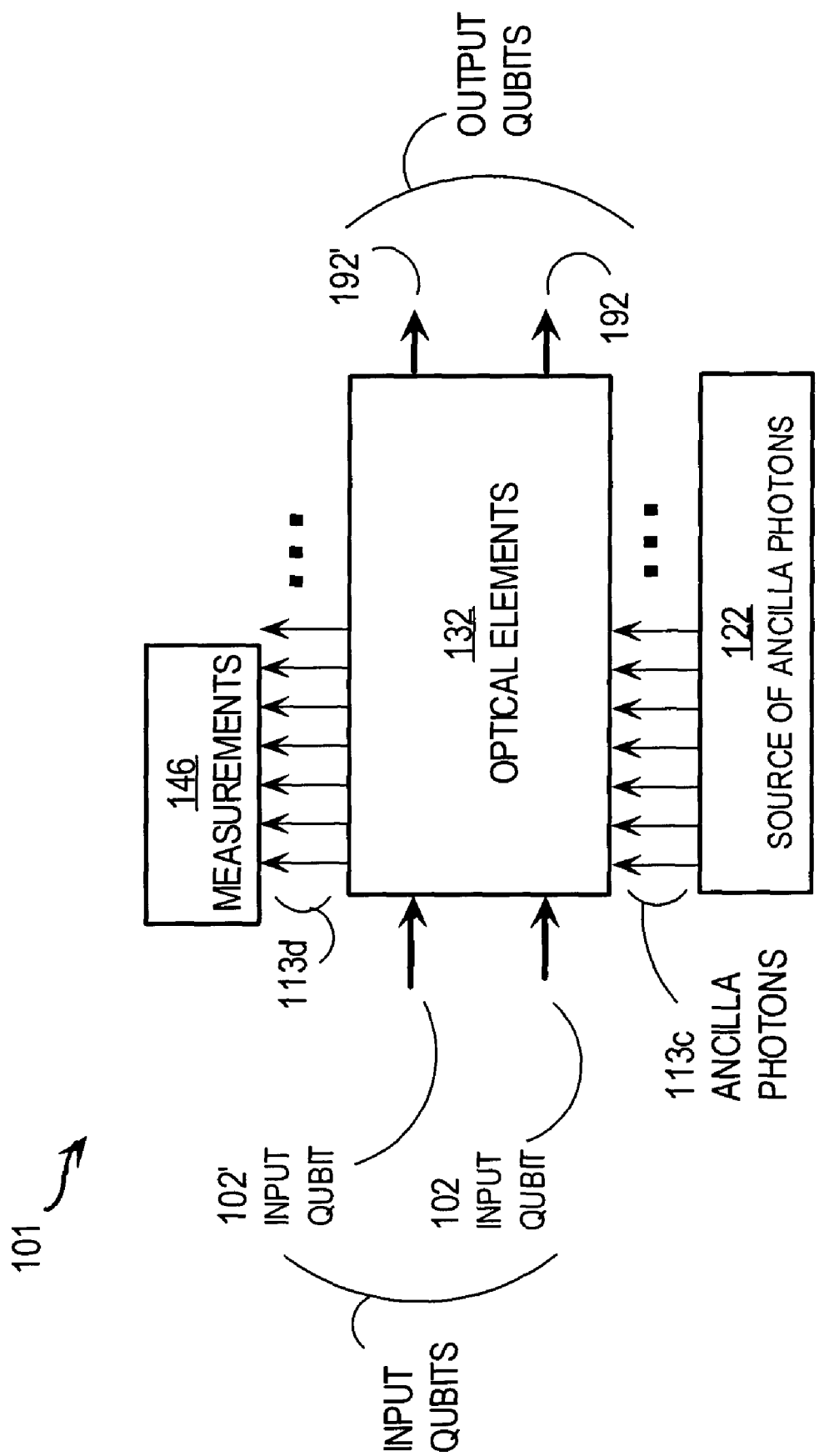

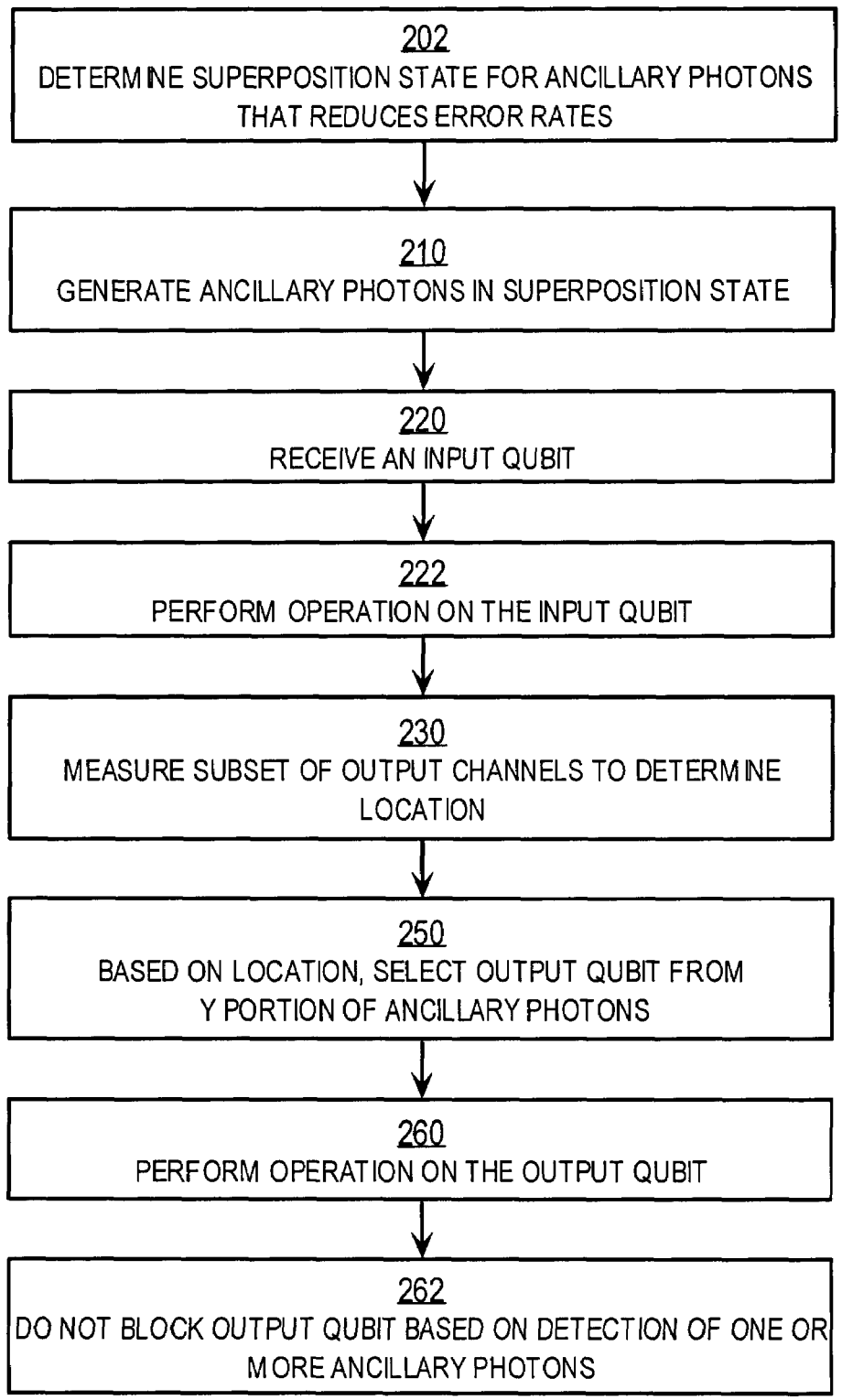

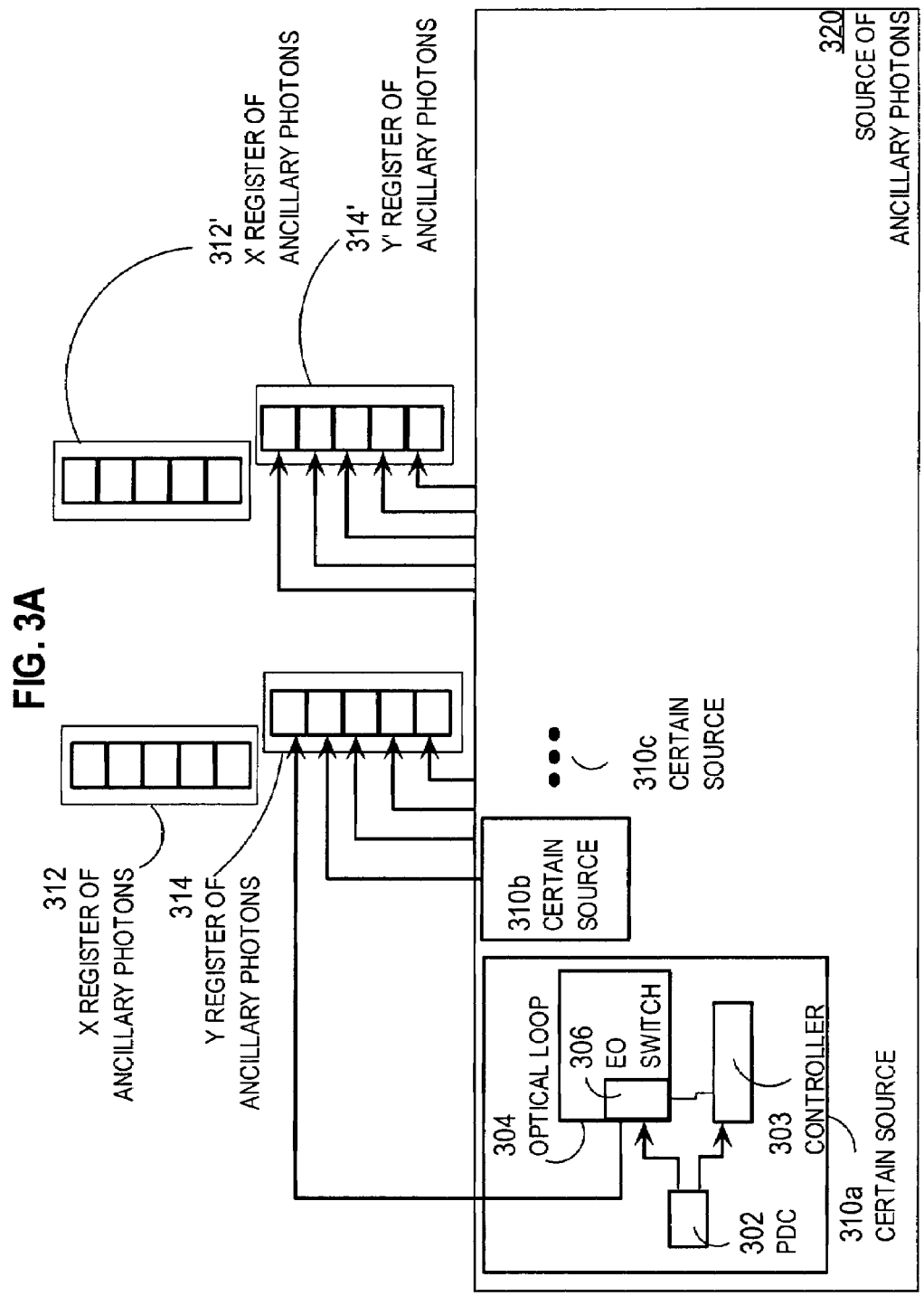

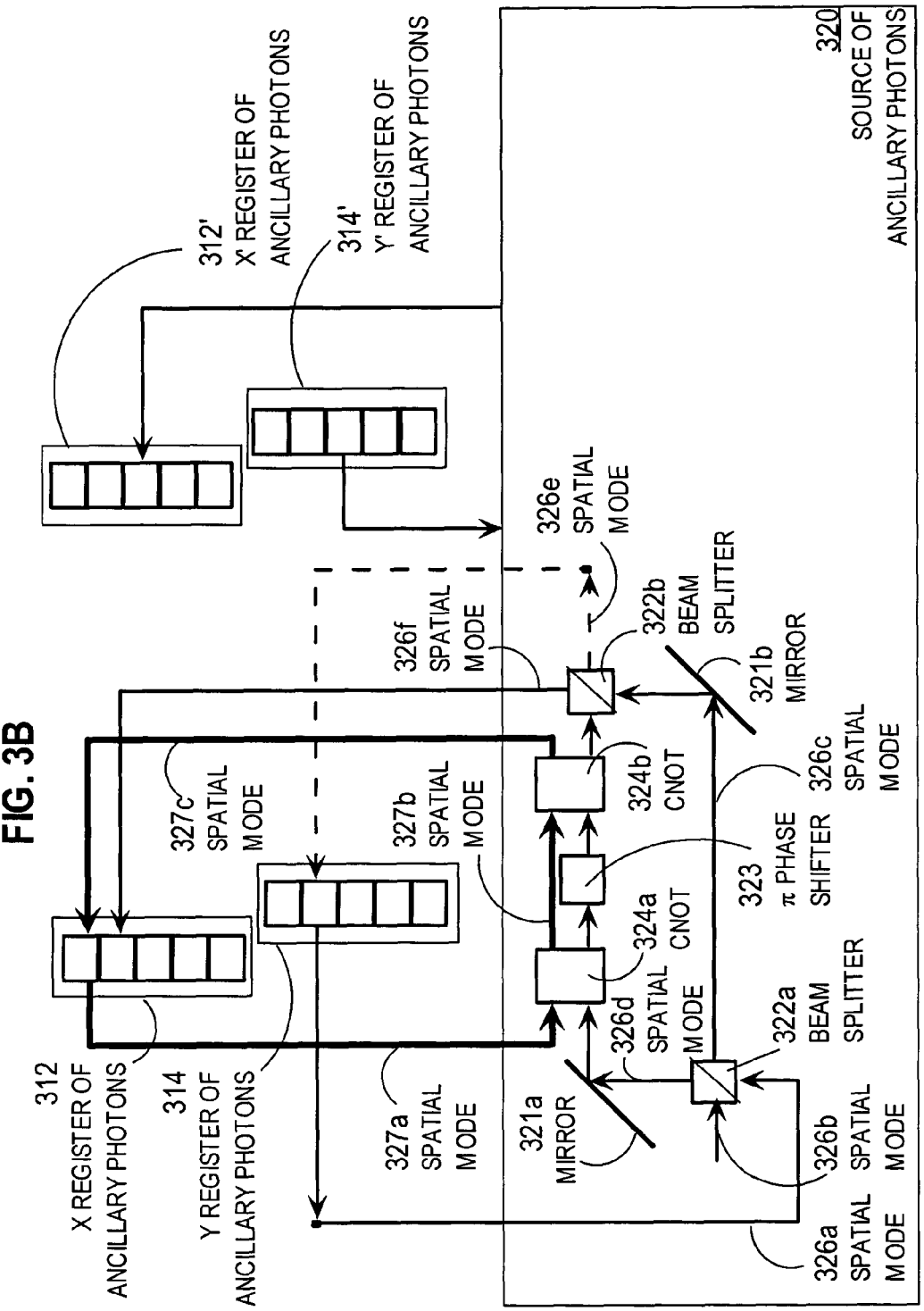

US 7,006,267 B2

TECHNIQUES FOR HIGH FIDELITY QUANTUM TELEPORTATION AND COMPUTING

CROSS-REFERENCE TO RELATED APPLICATIONS

This application claims benefit of Provisional Appln. 60/431,835, filed Dec. 9, 2002, the entire contents of which are hereby incorporated by reference as if fully set forth herein, under 35 U.S.C. §119(e).

This application claims benefit of Provisional Appln. 60/433,072, filed Dec. 13, 2002, the entire contents of which are hereby incorporated by reference as if fully set forth herein, under 35 U.S.C. §119(e).

This application claims benefit of Provisional Appln. 60/443,316 filed Jan. 29, 2003, the entire contents of which are hereby incorporated by reference as if fully set forth herein, under 35 U.S.C. §119(e).

This application is related to U.S. patent application Ser. No. 10/286,735, by T. Pittman et al., filed Nov. 1, 2002 (hereinafter referenced as Pittman I), the entire contents of which are hereby incorporated by reference as if fully set forth herein.

This application is related to U.S. patent application Ser. No. 10/639,559, by T. Pittman et al., filed Aug. 12, 2003 (hereinafter referenced as Pittman II), the entire contents of which are hereby incorporated by reference as if fully set forth herein.

STATEMENT OF GOVERNMENTAL INTEREST

This invention was made in part with Government support under Contract No. N0001491J1485 awarded by the Office of Naval Research and under Contract No. DAAD19-02-1-0069 awarded by the Army Research Office. The Government has certain rights in the invention.

BACKGROUND OF THE INVENTION

1. Field of the Invention

The present invention relates to quantum information processing, and, in particular, to techniques for increasing the fidelity of teleportation and logic operations on quantum bits (qubits) represented by quantum states of single photons.

2. Description of the Related Art

Information processing using classical computers relies on physical phenomena, such as magnetic fields, voltages, and optical intensity that can be produced and measured in each of two basis states, one basis state representing a zero and another basis state representing a one. Each physical element that can achieve either of these two states represents one binary digit, called a bit. Quantum information processing uses physical elements that exhibit quantum properties that may include, not only one of the two or more basis states, but also an arbitrary superposition state of the basis states. A superposition state has some non-zero probability of being measured as one of the basis states and some non-zero probability of being measured as another of the basis states. A physical element that exhibits quantum properties for two basis states represents one quantum bit, also called a qubit. Physical elements that are suitable for representing qubits include the spins of single electrons, electron states in atoms or molecules, nuclear spins in molecules and solids, magnetic flux, spatial propagation modes of single photons, and polarizations of single photons, among others.

Logical operations performed on qubits apply not only to the basis states of those qubits but also to the superposition states of those qubits, simultaneously. Quantum computers based on logical operations on systems of qubits offer the promise of massively simultaneous processing (also called massively parallel processing) that can address problems that are considered intractable with classical information processing. Such classically intractable problems that can be addressed with quantum computers include simulation of quantum interactions, combinatorial searches of unsorted data, finding prime factors of large integers, solving for cryptographic keys used in current secure communication algorithms, and truly secure communications (also called "quantum cryptography").

One approach uses linear interactions between single photons but relies on interferometer techniques, e.g., interference on two spatial modes of propagation for a single photon. For example, logic gates using this approach have been proposed by E. Knill, R. Laflamme, and G. J. Milburn, "A scheme for efficient quantum computation with linear optics," *Nature*, vol. 409, p. 49, 4 Jan. 2001 (hereinafter Knill) and by M. Koashi, T. Yamamoto, and N. Imoto, "Probabilistic manipulation of entangled photons," *Physical Review A*, vol. 63, 030301, 12 Feb. 2001 (hereinafter Koashi), the entire contents of each of which are hereby incorporated by reference as if fully set forth herein. These devices are called "probabilistic" logical gates because they perform the desired logical operation in response to only a fraction of the input photons. However, it can be determined when an operation is performed successfully, so that, in a separate step often called a "post selection" step or a "post-detection selection" step, output photons are blocked unless the operation is successfully performed. It has been shown that the fraction can be increased close to a value of one with sufficient numbers of components and extra photons (called "ancilla photons" or "ancilla") in particular states.

Although the occurrence of certain failures in the Knill approach can be identified by measurements on the ancilla, devices based on the Knill approach might still benefit from the use of quantum error correction techniques. The certain failures identified are equivalent to z-measurement errors, which can be corrected using a simple two-bit concatenated code that operates even in the presence of a relatively high error rate (e.g., as described in E. Knill, R. Laflamme, and G. Milburn, quant-ph/0006120). The devices proposed in Knill also suffer from errors due to thermally induced phase shifts on the two spatial modes. The same two-bit code can be used to correct for phase-shift errors and possibly for photon losses. Other probabilistic, linear devices proposed by Koashi reduce the phase shifts by including a large number of additional components and other resources, such as sources of a large number of qubits in particular states. However, the two-bit code and the approach of Koashi have not been shown to correct for more general errors, e.g., errors that would be introduced by imperfect generation of the entangled ancilla states.

The use of more general quantum error correction approaches require a relatively low error rate, called the "error threshold" of the correction approach. For the Knill approach to reduce error rates below the error threshold of general quantum error correction, a large number of ancilla photons are needed. Knill shows that the failure probability could decrease as 1/N, where N is the number of ancilla photons, in the limit of large N. With sufficiently large N, the approach of Knill should be able to be used with general quantum error correction approaches.

However, there are several additional problems if the number N of ancilla becomes too great. One additional problem is that an increase in N involves an increase in the number of resources required in a quantum computing device to generate the increased number of ancilla. Another problem is that an increase in N increases the probability of technical errors (e.g. phase shifts, photon loss, etc.) in the logic operation using the extra ancilla along with the probability that an error will occur in the generation of one or more ancilla. Thus a point of diminishing returns may be reached where it becomes more difficult to reduce the error rate below the error threshold because the increase in the number of ancilla to reduce the intrinsic error (1/N) in the Knill approach also increases the chances of technical errors in the generation of the ancilla or in the logic device using the extra ancilla.

Based on the foregoing description, there is a clear need for techniques that increase the fidelity of quantum logic operations on qubits represented by single photons that do not suffer the deficiencies of current approaches. In particular, there is a clear need for techniques that decrease the failure rate of quantum logic operations at a rate faster than the reciprocal of the first power of the number of ancilla.

The approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

SUMMARY OF THE INVENTION

Optical techniques are described for performing quantum teleportation and quantum logic operations with high fidelity (low error probability). These techniques allow such operations to be performed with much lower error probabilities than any other method previously known. The low error probability is beneficial for quantum computing applications, because the average error probability must be below the threshold for quantum error correction in order for such correction methods to apply. These quantum error correction methods allow many more useful calculations to be performed than can be performed without such corrections. In addition, quantum teleportation with low error rates would also enable the development of quantum repeaters, which would extend the maximum range of secure communications systems based on quantum key distribution. No secure communications systems based on quantum key distribution known to the inventors are currently in practical use because the maximum range is too small. Thus, embodiments of the current invention will be of major benefit to the development of quantum computers, quantum key distribution systems, and other forms of quantum information processing.

According to one aspect of the invention, a method for high fidelity quantum teleportation includes receiving an input photon representing a particular quantum superposition state for logical values 0 and 1. Ancilla photons are generated in a particular ancilla quantum state chosen to reduce a rate of error for obtaining a teleported photon below a threshold error rate. The ancilla photons are combined with the input photon using one or more linear optical elements to populate output channels. A number of photons representing logical value 1 are measured in a subset of the output channels. A particular output channel is determined based on the measured number of photons. A teleported photon is obtained at the particular output channel with the desired quantum superposition state of the input photon and an error rate below the threshold error rate.

According to another aspect of the invention, a method for high fidelity quantum logic operations includes receiving multiple input photons representing corresponding quantum superposition states for logical values 0 and 1. Ancilla photons are generated in a particular ancilla quantum state chosen to reduce a rate of error for obtaining a result of a particular logical operation below a threshold error rate. The ancilla are combined with the input photons using one or more linear optical element to populate output channels. A number of photons representing logical value 1 are measured in a first subset of the output channels. A second subset of output channels is determined based on the number of photons measured. A result of the logical operation is obtained with an error rate below the threshold error rate as output photons on the second subset of output channels.

In some embodiments of these aspects, the threshold error rate is a rate of error of a probabilistic method for performing the logical operation. In some embodiments, the threshold error rate is a threshold rate of error for a quantum error correction method.

In some embodiments of these aspects, a phase correction is applied to a photon in an output channel based on the number of photons measured.

In some embodiments of these aspects, generating the ancilla includes producing an electron in an excited state in an array of quantum dots for each ancilla photon to be produced with a logical value of 1. The electron in the excited state is positioned among the quantum dots based on the particular ancilla quantum state. The excited electron is caused to emit a photon into a spatial mode corresponding to an ancilla photon.

In other aspects of the invention, devices are provided that implement these methods.

As a consequence of sufficient error reduction achieved by some embodiments of this invention, all outputs of quantum computations can be used, without post selection, because any errors can be corrected using general quantum error correction algorithms. Therefore these techniques increase the chances of producing non-probabilistic (deterministic) quantum computations.

BRIEF DESCRIPTION OF THE DRAWINGS

The present invention is illustrated by way of example, and not by way of limitation, in the figures of the accompanying drawings, in which like reference numerals refer to similar elements and in which:

FIG. 1A is a block diagram that illustrates a device for performing high fidelity (low error rate) quantum teleportation on one input qubit, according to an embodiment;

FIG. 1B is a block diagram that illustrates a device for performing high fidelity (low error rate) quantum logic operations on two input qubits, according to an embodiment;

FIG. 2 is a flow diagram that illustrates a method for performing high fidelity quantum operations on an input qubit, according to an embodiment;

FIG. 3A is a block diagram that illustrates a first portion of a source of entangled ancilla photons, according to an embodiment;

FIG. 3B is a block diagram that illustrates a second portion of a source of entangled ancilla photons, according to an embodiment;

DETAILED DESCRIPTION

Figure 1C:
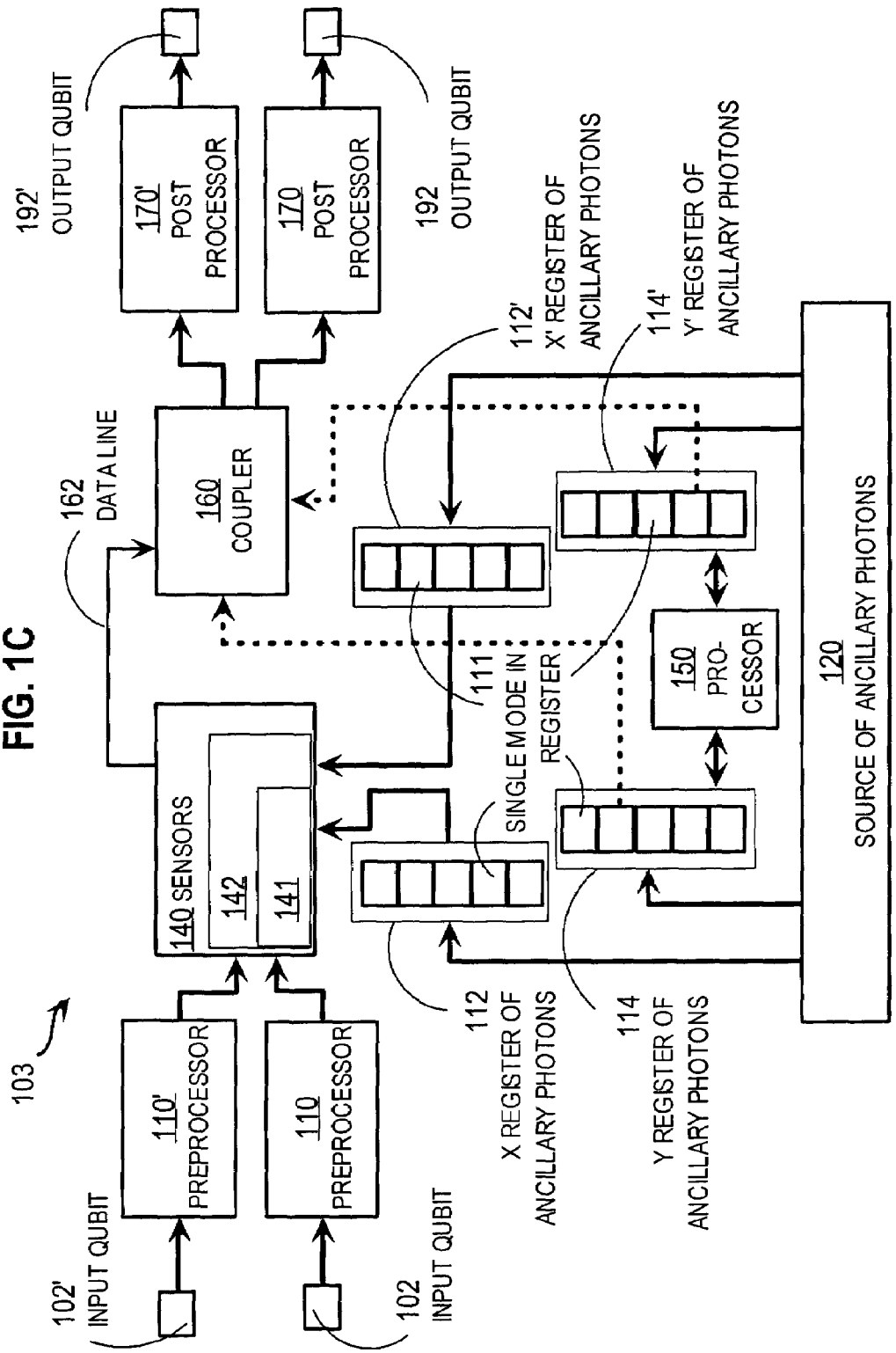
FIG. 1C is a block diagram that illustrates a device for performing high fidelity quantum operations on one or two input qubits, according to an embodiment.

Methods and apparatuses for high fidelity quantum computing using qubits represented by single photons are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments of the present invention are described in the context of one or more single qubits that each represent the arbitrary superposition of two basis states; a first basis state representing the logical value "one" and indicated by the presence of a photon in a particular spatial mode, and a second basis state representing the logical value "zero" and indicated by the absence of a photon in that spatial mode. As used herein, a spatial mode is a direction of propagation of a single photon along a particular set of locations, such as in an optical fiber, or along straight-line segments between mirrors in free space. As used herein a "photon" includes a photon in either basis state or in an arbitrary superposition of the basis states. However, embodiments of the invention are not limited to this context. The invention may be applied in any quantum computing context using photons to represent qubits.

For example, embodiments of the invention may be used where qubits are represented by the polarization state of single photons. It is well known that a qubit represented by polarization states of a photon can be converted to a qubit represented by presence or absence in a particular spatial mode by passing the photon through a polarizing beam splitter. Similarly, a qubit represented by presence or absence in a particular spatial mode can be converted to a qubit represented by polarization states by passing the photon in the particular spatial mode through a rotator that rotates the photon to a first polarization representing a first basis state, e.g., a horizontal polarization; and by passing a photon in the complimentary spatial mode through a rotator that rotates the photon to a second, orthogonal polarization representing a second basis state, e.g., a vertical polarization; and then merging the two spatial modes.

In further examples, embodiments of the invention may be used where the qubits of interest are logical qubits made up of one or more layers, each layer made up of one or more single qubits represented by individual photons. In such embodiments, the logical qubits can be operated upon by the proper sequence of operations on the single qubits, as described herein.

1. Structural Overview

The basic operation of the invention can be understood from embodiments depicted in FIG. 1A and FIG. 1B and described in the next few paragraphs. More detailed embodiments of the invention are then described in the following sections. A more succinct account of the invention from a scientific point of view can be found in a recently published paper on the subject by J. D. Franson, M. M. Donegan, M. J. Fitch, B. C. Jacobs, and T. B. Pittman, "High-Fidelity Quantum Logic Operations Using Linear Optical Elements," *Physical Review Letters*, vol. 89, 137901, 23 Sep. 2002, the entire contents of which are hereby incorporated by reference as if fully set forth herein. All of the essential details from that paper are explicitly included herein.

A high-fidelity method for quantum teleportation is shown in FIG. 1A. An input channel 102 (one embodiment of which is an optical fiber) is capable of transporting an input photon to the device. In one embodiment, the presence of a single photon represents the logical value 1 and the absence of a photon represents the logical value 0. In quantum mechanics, there may be some nonzero probability amplitude for the value 0 and some nonzero probability amplitude for the value 1, which is referred to as a superposition state. The intended function of the invention is to transfer an arbitrary quantum state of the input to a distant location with small error probability even in the presence of losses or noise.

As illustrated in FIG. 1A, a plurality of additional photons are input to the device using additional channels 113a (one embodiment of which would be to use additional optical fibers). These additional photons are hereinafter referred to as "ancilla photons," or "ancilla" and are produced in source device 121. With all generality, the number of such additional photons is denoted as N. The input photon is then combined with the N ancilla photons using one or more linear optical elements 131, such as mirrors, lenses, beam splitters, and phase shifters. A set of output channels 113b (one embodiment of which would be N+1 additional optical fibers) provides a means for the photons to leave the device. Measurements are made in device 145 to determine the number of photons leaving the device in some but not all of the output channels 113b. It is expected that the quantum state of the input qubit will have been teleported to one of the output channels 113b, designated as output channel 192, which is determined by the results of the measurements, aside from a phase correction that can be applied using devices that are well known to the state of the art (one embodiment of which is a Pockels cell). A feature of an illustrated embodiment is that the quantum state of the ancilla photons produced in source 121 can be chosen to reduce the probability of an error in this process to be proportional to the inverse of the square of N, which is much smaller than the error in any previous method.

A high-fidelity method for quantum logic operations is illustrated in FIG. 1B. This method is a generalization of the quantum teleportation described above, in that two input channels 102, 102' now allow two photons representing two qubits to be input to the device. The intended function of this device is to perform a logic operation on the two input qubits while teleporting the result to two different output channels. Examples of embodiments of these logic operations include a controlled sign gate and a controlled-NOT gate, the intended functions of which are all well known in the art. As in the teleportation described above, additional photons, or ancilla, generated in source 122 are input to the device along channels 113c and combined with the two inputs using one or more linear optical elements 132. Once again, a set of output channels 113d provides a means for the photons to leave the device. In device 146, measurements are once again made to determine the number of photons leaving the device in some but not all of the output channels 113d. It is expected that this device will produce the desired logical output in two of the output channels 113d, designated output channels 192, 192', determined from the measurements made in device 146, as described in detail below, aside from phase corrections that can be applied using techniques that are well known. Once again, a feature of the illustrated embodiments is that the quantum state of the ancilla photons produced in source 122 can be chosen to reduce the probability of an error in the outputs to be proportional to the inverse of the square of the number of ancilla photons, which is much smaller than the error in any previous method.

One embodiment of a method for generating the required additional or ancilla photons in the optimal quantum state has been described in the literatureby J. D. Franson, M. M. Donegan, and B. C. Jacobs, "Generation of Entangled Ancilla States for use in Linear Optics Quantum Computing," quant-ph/0303137, the entire contents of which are hereby incorporated by reference as if fully set forth herein. The essential details of that reference are described below. The operation of similar logic devices for the case of N=1 has been experimentally demonstrated by T. B. Pittman, B. C. Jacobs, and J. D. Franson, "Demonstration of Nondeterministic Quantum Logic Operations Using Linear Optical Elements," Physical Review Letters, vol. 88, 257902, 2002.

FIG. 1C is a block diagram that illustrates a device 103 for performing a high fidelity quantum operation on one or two input qubits, according to an embodiment. In some embodiments, a device for performing a high fidelity quantum teleportation or logical operation includes more or fewer input qubit spatial modes. The elements of FIG. 1C are described in the context of two input qubits that enter the device on input qubit spatial modes 102, 102', also called input channels. In some embodiments, fewer than every input spatial mode 102, 102' is used.

The device 103 includes preprocessors 110, 110' connected to corresponding input qubit spatial modes 102, 102', respectively. Each of preprocessors 110, 110' performs a single qubit transformation of an input qubit on the corresponding spatial mode 102, 102', respectively, using linear optics elements. In some embodiments, either or both preprocessors 110, 110' are omitted.

The device 103 includes sensors component 140 connected to multiple spatial modes. The sensors component 140, like measurements devices 145, 146, measures one or more properties of groups of photons on the connected spatial modes, as described in more detail below. In the illustrated embodiment, sensors component 140 includes two sensors 141, 142 connected to spatial modes optically connected to input qubit spatial modes 102, 102', respectively, through preprocessors 110, 110', respectively. In other embodiments, sensors component 140 includes more or fewer sensors.

Device 103 also includes a source 120 of ancilla photons. The source 120 of ancilla photons outputs at least partially entangled photons into banks of multiple spatial modes called registers 112, 112', 114, 114'. Roughly speaking, two or more photons are entangled if their states are correlated in a non-trivial manner, e.g., the chances of one photon being measured in one state is related to the measured state of another photon among the entangled photons. Each register includes multiple instances of single spatial modes 111. X register 112 and y register 114 are associated with the input qubit on input spatial mode 102; and x' register 112' and y' register 114' are associated with the input qubit on input spatial mode 102'. In some embodiments in which input qubit spatial mode 102 is omitted, associated x register 112, and associated y register 114 are also omitted. Several implementations for the source 120 of ancilla photons are described in more detail in later sections.

The spatial modes 111 in the primed and unprimed x registers 112', 112 are also connected to sensors component 140. In the illustrated embodiment, the spatial modes 111 in x register 112 are connected to sensor 141; and the spatial modes 111 in x' register 112' are connected to sensor 142. Sensors component 140 measures some property of the photons in the connected registers to generate output data that indicates which spatial mode 111 in the primed and unprimed y registers 114', 114 provides output qubits. In the illustrated embodiment, sensor 141 measures a property of the photons in x register 112 and the qubit from input spatial mode 102 to indicate a single mode in y register 114. Similarly, sensor 142 measures a property of the photons in x' register 112' and the qubit from input spatial mode 102' to indicate a single mode in y' register 114'.

Device 103 also includes an optical coupler 160 to output a qubit that represents a result of the quantum operation. Sensors component 140 is connected to optical coupler 160 via data line 162. In the illustrated embodiment, data line 162 is a classical data line; in other embodiments data line is an optical spatial mode for carrying a qubit or photon in a particular state. Output data from sensors component 140 is transferred to optical coupler 160 over data line 162; and optical coupler 160 selects a single spatial mode 111 from each of the y registers 114, 114' based on that output data. In FIG. 1C, the single spatial mode 111 selected by the optical coupler 160 from each y register is represented by a dotted arrow connecting the single spatial mode to the coupler 160. In some embodiments in which input qubit spatial mode 102 is omitted, optical coupler 160 outputs only one qubit, based on y' register 114'.

In the illustrated embodiment, device 103 also includes a processor 150 to modify the photons in either or both y registers 114, 114' using linear optical elements. Operations performed by processor 150 in some embodiments are described in more detail below. For example, processor 150 is used to change the phase of a photon propagating in one or more of the spatial modes in either or both the y-registers 114, 114', or to combine the photons in the two registers 114, 114' to effect some logical operation. In some embodiments, processor 150 is omitted.

The device 103 includes, connected to optical coupler 160, post-processors 170, 170' connected to corresponding output qubit spatial modes 192, 192', respectively. Output qubit spatial modes 192, 192' carry outputs that are based, at least in part, on input qubit spatial modes 102, 102', respectively. In some embodiments in which input qubit spatial mode 102 is omitted, associated output qubit spatial mode 192 is also omitted.

Each of postprocessors 170, 170' performs a single qubit transformation of an output qubit from the optical coupler 160 for the corresponding spatial mode 192, 192', respectively, using linear optical elements. In some embodiments, either or both postprocessors 170, 170' are omitted.

Knill describes a quantum teleportation device and a quantum controlled sign flip device based on various embodiments that can be described in the context of device 103. As described above, the function of quantum teleportation is to output a qubit that has the same superposition state as an input qubit but in a different spatial mode from the input qubit, without measuring the input qubit. The function of a quantum controlled sign flip (CZ) device is to change a sign of a value of a first base component corresponding to the first basis state of an input "target" qubit if a second input, "control" qubit would be measured in the |1] state and to do nothing if the control qubit would be measured in the |8] state, without measuring either the target qubit or the control qubit. For example, if the control qubit would be measured in the |1] state, then a CZ device converts a target qubit in the state {α|1]+β|0]} to the state {-α|1] +β|0]}. The Knill devices do not employ preprocessors 110, 110' and do not employ post-processors 170, 170'.

The devices of Knill use a particular superposition state for the entangled ancilla photons in x registers 112, 112' and y registers 114, 114'. The superposition state for the entangled ancilla is such that specific basis states that would be measured for the photons in those registers form a particular sequence of basis states among a limited set of such sequences. Herein, a "sequence of basis states" or simply a "sequence" denotes a possible combination of values in which a number of photons could be found. For example, in a two-photon system, one such sequence could be 01, indicating that the first photon is found to be 0 and the second is found to be 1. The chance that the x and y registers would be measured in a particular sequence of the set is equal to the chance that the x and y registers would be measured in any other sequence of the set. Thus, if there are M sequences of basis states for the registers, then the chance that the registers would be measured in a specific one is 1/M. The superposition state of the ancilla is given by a weighted sum of the sequences in the set using a constant weight.

According to some embodiments of the invention, to reduce errors, the chance of the registers being measured in at least one sequence of the set is different from the chance of the register being measured in a different sequence. Thus, if there are M sequences, then, for at least one of those sequences, the chance that the registers would be measured with that sequence is different from 1/M. The superposition state of the ancilla is given by a weighted sum of the sequences in the set using a non-constant weight. Therefore, according to embodiments of the invention, the source 120 of ancilla photons for the device is different from a source proposed by Knill. As is shown below, changing the chances of measuring ancilla photons in the different sequences can decrease the probability of error in output qubits from the device, which represent results of quantum logical operations and teleportation, collectively referenced herein as quantum operations.

2. Quantum Operations

The effects of unequal probabilities for different sequences are described in the context of implementations of device 103 for performing example quantum operations. The quantum operations described are teleportation for a single qubit and for pairs of qubits, a quantum sign flip, and a quantum CNOT. D. Gottesman and I. Chuang, Nature, London, vol. 402, p 390, 1999 (hereinafter Gottesman) have showed that quantum logic operations can be performed using quantum teleportation, where the desired logic operation is applied to an entangled pair of ancilla rather than to the input qubits. Probabilistic techniques can be applied repeatedly until the necessary ancilla entangled state is generated. The desired logic operation is performed by teleporting the qubits of interest.

2.1 Teleportation of Single Qubit

In general, a teleportation device receives a qubit in the arbitrary state {α|1]+β|0]} in one spatial mode and outputs a qubit in the same state {α|1]+β|0]} in a different spatial mode. For some embodiments that teleport single qubits, some or all components in device 103 that are not used are omitted. Omitted components in some embodiments include preprocessors 110, 110', post-processors 170, 170', and one input qubit spatial mode (e.g., 102) and the corresponding sensor (e.g., 141), x register (e.g., 112), y register (e.g., 114) and output qubit spatial mode (e.g., 192).

According to an approach described in Knill, teleportation can be achieved by selecting an output qubit from a spatial mode in y' register 114' based on particular measurements made by sensor 142 on the photons in the x' register 112' and the input qubit spatial mode 102'. In this operation, the ancilla photons in the x' register 112' and the y' register 114' are in a particular superposition state.

The particular superposition state in Knill corresponds to equal chances of being measured in any one of a particular set of sequences of basis states, or simply "sequences" forming the superposition state. There are n+1 sequences in the set; and there are n spatial modes in each of the x' register 112' and the y' register 114'. Each sequence in the set is identified by the index variable j, where j varies between 0 and n. As shown by Knill, and described in more detail below, these same sequences are used for teleportation of two qubits and sign flip operations. As will also be shown below, these same sequences are used in a quantum CNOT operation.

An example set of sequences for n=5 is shown in Table 1, where, for single qubit teleportation, the term "x-reg" refers to the x'register 112' and the term "y-reg" refers to the y' register 114' and index j refers to j'. In other operations or other embodiments the term x-reg refers to either or both of the primed and unprimed x registers 112, 112', and the term y-reg refers to either or both of primed and unprimed y registers 114, 114' and the index j refers to either or both of the primed and unprimed index, j, j'. According to Knill, in Table 1, the value "1" corresponds to the state |1] which represents a single photon present in the spatial mode, e.g., a first state of the two basis states; and the value "0" corresponds to the state |0] which represents a single photon absent in the spatial mode, e.g., a second state of the two states. In other embodiments, the value "1" corresponds to a first basis state (e.g., a horizontally polarized photon) and the value "0" corresponds to a second basis state (e.g., a vertically polarized photon).

TABLE 1

Example set of sequences of basis states for n = 5.

| Index (j) | x-reg mode 1 | x-reg mode 2 | x-reg mode 3 | x-reg mode 4 | x-reg mode 5 | y-reg mode 1 | y-reg mode 2 | y-reg mode 3 | y-reg mode 4 | y-reg mode 5 |
|---|---|---|---|---|---|---|---|---|---|---|
| 0 | 0 | 0 | 0 | 0 | 0 | 1 | 1 | 1 | 1 | 1 |
| 1 | 1 | 0 | 0 | 0 | 0 | 0 | 1 | 1 | 1 | 1 |

TABLE 1-continued

Example set of sequences of basis states for n = 5.

| Index (j) | x-reg mode 1 | x-reg mode 2 | x-reg mode 3 | x-reg mode 4 | x-reg mode 5 | y-reg mode 1 | y-reg mode 2 | y-reg mode 3 | y-reg mode 4 | y-reg mode 5 |
|---|---|---|---|---|---|---|---|---|---|---|
| 2 | 1 | 1 | 0 | 0 | 0 | 0 | 0 | 1 | 1 | 1 |
| 3 | 1 | 1 | 1 | 0 | 0 | 0 | 0 | 0 | 1 | 1 |
| 4 | 1 | 1 | 1 | 1 | 0 | 0 | 0 | 0 | 0 | 1 |
| 5 | 1 | 1 | 1 | 1 | 1 | 0 | 0 | 0 | 0 | 0 |

As can be seen from the example in Table 1, in the general case the sequence of basis states for the index j includes j modes with photons in the first basis state (e.g., |1⟩), followed by n modes with photons in the second basis state (e.g., |0⟩), followed by n−j modes with photons in the first basis state (e.g., |1⟩). When split between the x' register and the y' register and using the states |1⟩ and |0⟩ as the first and second basis states, respectively, the pattern is described as an x' register with j modes in |1⟩ and j−n modes in |0⟩ and a y' register with j modes in |0⟩ and n−j modes in |1⟩. If the symbol |ψj'⟩ represents the basis states that would be measured in the x' and y' registers in the sequence with index j', then this description is denoted by the expression in Equation 1, where the state of the x' register is separated from the state for the y' register by a space.

$$|\psi j'\rangle = |1\rangle^{j'}|0\rangle^{n-j'} |0\rangle^{j'}|1\rangle^{n-j'} \quad (1)$$

Initially, the x' and y' registers are in an entangled state formed by the superposition of the sequences of the set of sequences. As a consequence, the number of photons in either register is indeterminate, e.g. no, or all n, of the photons, or some other value between 0 and n photons could be found in the x' register. As in Knill, this is done to avoid determining the measured state of the input qubit during the measurements by sensors component 140. Therefore, the initial state of the ancilla photons in the x' and y' registers, represented by the symbol |ψ$_{A'}$⟩, is given by a weighted sum (superposition) of the individual sequences, with a weighting factor represented by the symbol f(j'), as given by Equation 2a.

$$|\psi_{A'}\rangle = \Sigma_{j'=0,n} f(j')|1\rangle^{j'}|0\rangle^{n-j'}|0\rangle^{j'}|1\rangle^{n-j'} \quad (2a)$$

According to Knill, f(j') is a constant related to 1/(n+1) (e.g., a constant equal to $\{1/(n+1)\}^{1/2}$). According to some embodiments of the present invention, f(j') is not a constant, but varies with j', such that the sum of f(j')$^2$ over all j' from 0 to n is one. This is the normalization requirement, as expressed in Equation 2b.

$$\Sigma_{j'=0,n} f(j')^2 = 1 \quad (2b)$$

The probability (i.e., the "chance") that sequence i will be selected from the set of n+1 sequences, represented by the symbol $P_i$, is equal to f(i)$^2$ as expressed in Equation 2c.

$$P_i = f(i)^2 \quad (2c)$$

The set of sequences is such that there are exactly n ancilla photons in the first basis state (e.g., representing logical value "1") among the 2n spatial modes of the x' and y' registers.

The measurement made in the sensors component 140 indicates the number k of photons in the first basis state (e.g., logical value "1") among the x' register and the input qubit spatial mode 102'. For convenience, the spatial modes made up of the x' register and the input spatial mode 102' are called the c' register. The number k of photons in the first basis state in the c' register indicates the position in the y' register with the same state as the input qubit on spatial mode 102'. Table 2 gives the value of k for the two basis states of the input qubit for all six sequences when n=5 to demonstrate that the indicated ancilla photon is in the correct state. For example, if the input qubit is in state |1⟩ then the number k of photons in state |1⟩ in the c' register is given in the second column of Table 2 for the different values of j' when n=5. The photon in the spatial mode of the y' register indicated by k in the second column of Table 2 is always in state |1⟩, like the input qubit. Similarly, if the input qubit is in state |0⟩ then the number of photons in state |1⟩ in the c' register is given in the third column of Table 2 for the different values of j' when n=5. The photon in the spatial mode of the y' register indicated by the sum in the third column of Table 2 is always in state |0⟩, like the input qubit.

TABLE 2

Sum of photons in basis state |1⟩ based on index and state of input qubit.

| Index (j') | k = Sum (if input qubit is in |1⟩) | k = Sum (if input qubit is in |0⟩) |
|---|---|---|
| 0 | 1 | 0 |
| 1 | 2 | 1 |
| 2 | 3 | 2 |
| 3 | 4 | 3 |
| 4 | 5 | 4 |
| 5 | 6 | 5 |

Since there is no 0$^{th}$ or 6$^{th}$ spatial mode in the y' register when n=5, an error occurs when the sum is measured to be 0 or 6. This error corresponds to having measured the input qubit, and finding the value 0 if the sum is 0, or the value 1 if the sum is 6. Determination of the input qubit value is generally considered an error because any possible superposition information is lost. For the approach used by Knill, this occurs 1/(n+1) of the without regard to the distribution of qubit states between states |0⟩ and |1⟩. This error rate approaches 1/n for large values of n. Measurements that result in values of k from 1 through 5 are ambiguous about the state of the input qubit, as desired, e.g., sums from 1 through 5 do not indicate which column of Table 2 generated the sum. According to various embodiments, the factors f(0) or f(n), or both, that control the probability of the sequence with index 0 and index n, respectively, are reduced to be less than $\{1/(n+1)\}^{1/2}$ so that the error rate is less than in Knill.

Knill takes a probabilistic approach to eliminating the errors, by rejecting an output qubit when the value of k is zero or n+1. The failure rate corresponds to a rate of rejecting the output, which is 1/(n+1).

In order to avoid measuring the value of the input qubit while determining values of k in range from 1 through n, the states of the photons in the c' register are transformed in sensors module 140 before the measurement, such that the photons measured in the first basis state can not be associated with a particular spatial mode. For a state |1] that corresponds to the presence of a photon in a spatial mode, the transformation of associations between states and spatial modes can be accomplished with Fourier transform, as shown by Knill. The use of the Fourier transform imposes a constraint that f(k)=f(k−1), as described in more detail below. This is consistent with the choice by Knill to make f(j') constant for all j'.

According to embodiments illustrated here, the constraint imposed by the Fourier transform that f(k)=f(k−1) is approximately satisfied by using a large value for n and making f(i) a slowly changing function of i, so that a relationship described by Equation 3a holds:

$$f(k-1)=f(k)-df/dk \quad (3a)$$

where f(k) represents the value of f(i) and df/dk represents the derivative of f(i) at i=k, and the derivative is small compared to the value of f(k). This relationship can be written in terms of a fractional change $\epsilon(i)$ of f between successive values of i, which is a function of the index, as given by Equation 3b $$df/dk=\epsilon(k)*f(k) \quad (3b)$$

so that Equation 3a becomes a relationship as expressed in Equation 3c:

$$f(k-1)=f(k)*(1-\epsilon(k)) \quad (3c)$$

The fractional change $\epsilon(k)$ can be made arbitrarily small by sufficiently increasing n.

A theoretical basis for predicting a probability of error $P_E$ for an output qubit of teleportation based on this approach is described in more detail in a later section. In some embodiments, the predicted value of $P_E$ is $2/n^2$ for large n (i.e., for n>>1). In other embodiments, using an optimal choice for f(i) found numerically, a probability of error that is significantly smaller is predicted.

According to illustrated embodiments, no output is rejected based on the value measured for the ancilla, such as the value of k. Thus the illustrated embodiments are not probabilistic. If the error rate is sufficiently small, general error correction approaches can be implemented.

2.2 Teleportation of Two Qubits

As indicated by Gottesman, quantum logic operations on two qubits can be performed with a teleportation device that teleports a pair of input qubits in an arbitrary quantum state, including entangled states. Without loss of generality it is sufficient to describe the quantum operation in the context of two arbitrary but independent input qubits. As such, we assume that a two qubit teleportation device receives input qubits in the states {α|1]+β|0]} and {α'|1]+β'|0]} in two input spatial modes and outputs two qubits in the same states {α|1]+β|0]} and {α'|1]+β'|0]} in two different spatial modes, without measuring the input qubits (and therefore without determining the output qubits).

Using unequal probabilities of sequences for the initial ancilla, a teleportation device for two qubits can be implemented using the input modes 102, 102' and x register 112, x' register 112', y register 114, and y' register 114', as described here. Preprocessors 110, 110' and post processor 170, 170' are again omitted.

In this approach, the sensor 142 and the entangled state for ancilla photons in the x'register 112' and the y' register 114' are the same as described above. Furthermore, a sensor 141 that performs functions similar to sensor 142 is included. Sensor 141 operates on a c register made up of the input qubit spatial mode 102 and the x register 112

In addition, the set of sequences j for ancilla photons in the x register 112 and the y register 114 are the same as the set of sequences j' for the corresponding primed registers 112', 114', respectively, with the same unequal weights given by f(j), where f(j)=f(j') when j=j'. However, in this embodiment the primed (x',y') and unprimed (x,y) register pairs are independent. Consequently, the state of the 4n ancilla photons in the four registers 112, 112', 114, 114', represented by the symbol $|\psi_{AA'}]$ is given by Equation 4.

$$|\psi_{AA'}]=\Sigma_{j=0,n}f(j)|1]^{j}|0]^{n-j}|1]^{n-j}\Sigma_{j'=0,n}f(j')|1]^{j'}|0]^{n-j'}|1] \quad (4)$$

This corresponds to the tensor product of two sets of ancilla in the initial state of Equation 2a.

In some embodiments separate Fourier transforms are performed on the registers c and c', and the sums of photons measured in state |1] in the two c registers are given by k and k', respectively.

Some quantum operations can be implemented to output a transformed qubit on output qubit spatial mode 192' by performing logical operations on the photons in the y' register 114' based on the states of photons in the y register 114, for example with processor 150. The output qubit is selected for spatial mode 192' by coupler 160 from within the y' register 114' based on measurements on the c' register by sensor 142. In the notation of quantum operations, the control qubit, q, is the qubit incident on spatial mode 102 and the target qubit, q', is the qubit incident on spatial mode 102'. The target qubit is in an arbitrary state |q']=α'|1]+β'|0].

In some embodiments, the entangled states of ancilla photons in the primed and unprimed x and y registers are entangled differently in order to implement a particular quantum operation.

2.3 Controlled Sign Flip

In general, if the control qubit incident on a CZ device would be measured in the 1 state, a CZ device converts a target qubit in the state {α'|1]+β'|0]} to {−α'|1]+β'|0]}. Typically, the basis state that would be measured for the control qubit is unchanged in the process.

A CZ can be implemented by entangling the ancilla photons in x'register 112' and y' register 114' with the ancilla photons in the x register 112 and y register 114 as described in this section.

In an illustrated embodiment of the quantum sign flip, the state of the 4n ancilla photons in the four registers 112, 112', 114, 114', represented by the symbol $|\psi_{AA'}]$ is given by Equation 5.

$$|\psi_{AA'}]=\Sigma_{j=0,n}f(j)|1]^{j}|0]^{n-j}|1]^{n-j}$$
$$\Sigma_{j'=0,n}(-1)^{jj'}f(j')|1]^{j'}|0]^{n-j'}|1]^{n-j'} \quad (5)$$

This deviates from the tensor product of two sets of ancilla in the initial state of Equation 2, as shown in Equation 4, by the factor $(-1)^{jj'}$, which entangles the primed registers with the un-primed registers.

A theoretical basis for predicting a probability of error $P_E$ for an output qubit of the quantum sign flip based on this approach is described in more detail in a later section. In some embodiments, the predicted value of $P_E$ is $4/n^2$ for large n (i.e., for n>>1). In other embodiments, using an optimal choice for f(i) found numerically, a probability of error significantly smaller is predicted.

2.4 Controlled NOT

The function of a controlled not (CNOT) device is to flip values of the two components corresponding to the two basis states of a target qubit (e.g., a pure 0 state is flipped to a pure 1 state, and a pure 1 state is flipped to a pure 0 state) if a second, control qubit would be measured in the 1 state, and to do nothing if the control qubit would be measured in the 0 state, without measuring either the target qubit or the control qubit. In general, if the control qubit would be measured in the 1 state, a CNOT device converts a target qubit in the state $\{\alpha'|1\rangle+\beta'|0\rangle\}$ to an output qubit in the state $\{\beta'|1\rangle+\alpha'|0\rangle\}$. Typically, the basis state that would be measured for the control qubit is unchanged in the process.

According to embodiments of the invention, a CNOT is implemented by applying single qubit transformations to qubits in preprocessors 110 or 110', or both, before the CZ gate, and in postprocessors 170 or 170' both after the CZ gate.

In a particular embodiment of a high fidelity CNOT, preprocessor 110 and post-processor 170 are omitted. Preprocessor 110' and post-processor 170' each perform a Hadamard transformation, well known in the art. As is well known, a Hadamard transformation can be implemented with linear optics devices, such as a beam splitter.

3. Effects of Unequal Weights for Sequences

The following theoretical descriptions are presented in order to better understand the operation of device 103 with unequal values for the weighting factor f(i). However, embodiments of the invention are not limited by the theory or theories presented here, or by estimates of error based on these descriptions.

In the case of teleportation of a single qubit, the input qubit q' is the state $|q'\rangle=\alpha'|1\rangle+\beta'|0\rangle$, which for simplicity will be treated in the following as unprimed quantities, i.e., $|q\rangle=\alpha|1\rangle+\beta|0\rangle$.

The Fourier transform F operating on spatial mode l of register c corresponds to the operator transformation $$a_l \to \Sigma_{p=0,n} \exp(2\pi i p l/(n+1)) \, a_p \tag{6a}$$

where a bold character symbolizes a transformation, and spatial modes in the x register correspond to l=1,n and the qubit input spatial mode 102 corresponds to l=0; and i is the square root of negative 1. The exp( ) function represents raising the natural logarithm base, e, to the power represented by the argument between the parentheses of the exp( ) function. After the Fourier transform, the number of photons in the first basis state in mode e is given by $r_l$, and the total number k of photons in the first basis state is $$k = \Sigma_{l=0,n} r_l \tag{6b}$$

The measurement of k photons in the first basis state is a projection onto the subspace $|S_k\rangle$ of the original state vector that contains a total of k photons in the first basis state, as given by Equation 7.

$$|S_k\rangle = \beta|c0\rangle|y0\rangle + \alpha c1\rangle|y1\rangle \tag{7a}$$

where, by definition, $$|c0\rangle = f(k) \, F\{|0\rangle|1\rangle^k|0\rangle^{n-k}\} \tag{7b}$$

$$|y0\rangle = |0\rangle^k |1\rangle^{n-k} \tag{7c}$$

$$|c1\rangle = f(k-1) \, F\{|1\rangle|1\rangle^{k-1} |0\rangle^{n-k+1}\} \tag{7d}$$

$$|y1\rangle = |0\rangle^{k-1}|1\rangle^{n-k+1} \tag{7e}$$

Here $|c0\rangle$ represents the state of the c register after the Fourier transform if the input qubit would be measured in state $|0\rangle$ (e.g., a photon is absent on input qubit spatial mode 102) and therefore k photons were initially in the x register in the $|1\rangle$ state (e.g., k photons are present in the x register spatial modes). Similarly, $|c1\rangle$ represents the state of the c register after the Fourier transform if the input qubit would be measured in state $|1\rangle$ and therefore k−1 photons were initially in the x register in the $|1\rangle$ state. The weighting factor f(i) is 0 for i outside the interval 0 to n, i.e., unless $0 \leq i \leq n$. Thus if k=0, then $|c1\rangle$ in Equation 7d drops out; and if k=n+1, then $|c0\rangle$ in Equation 7b drops out.

As noted in Knill, applying a phase shift of $\exp(2\pi i l r_l/(n+1))$ to each mode l in register c after applying F is equivalent to shifting modes l=0,n right by one location before applying F. Consequently, the relevant terms in $|c0\rangle$ and $|c1\rangle$ differ only by a phase factor that can be compensated by applying a linear optics correction based on the measured value k to the output. Any method to apply this phase factor may be employed. In one embodiment, a Pockels cell is used. After the phase correction, the projection in state space of the measurement leaves the c register and sensors component 140 in a state represented by the symbol $|\psi_k\rangle$ and given by Equation 8a.

$$|\psi_k\rangle = c_n (\beta f(k)|y0\rangle + \alpha f(k-1)|y1\rangle)|M\rangle \tag{8a}$$

where $c_n$ is a normalization constant and $|M\rangle$ is the final state of the measurement device (e.g., sensor 141), both of which are the same for the α and β terms.

The contents of mode n+k, which is the $k^{th}$ spatial mode in the y register, is selected as the output and is always in the correct state, as described above, i.e., $|0\rangle$ for the β term and $|1\rangle$ for the α term. The state of photons in the remaining modes of the y register, represented by the symbol $|y_R\rangle$, following mode n+k, are in the same state for both the α and β terms. The final output state from the teleportation, represented by the symbol $|\psi_{out}\rangle$ is given by Equation 8b.

$$|\psi_{out}\rangle = c_n (\beta f(k)|0\rangle + \alpha f(k-1)|1\rangle)|y_R\rangle|M\rangle \tag{8b}$$

The states $|M\rangle$ and $|y_R\rangle$ are common to both the α and β output terms; and do not have an effect on the subsequent computations.

It can be seen from Equation 8b that the teleported state corresponds to the correctly teleported state if f(k)=f(k−1) as stated above in section 2.1. In Knill, all the values for f(i) are equal and the output is rejected if k=0 or n+1, as stated in section 2.1 above. According to the illustrated embodiments, the output given by equation 8b is accepted in all cases and the values of f(i) are chosen to reduce or minimize the average error rate.

The probability that the output state $|\psi_{out}\rangle$ given by equation 8b is the correct state $|q\rangle$ is represented by the symbol $P_S$ and given by equation 9a.

$$P_S = |[q|\psi_{out}\rangle]|^2 \tag{9a}$$

where $[q|\psi_{out}\rangle]$ is an inner product of the states that yields the fidelity of the quantum operation. The probability of an error, represented by the symbol $P_E$, is then given by equation 9b.

$$P_E = 1 - P_S = 1 - |[q|\psi_{out}\rangle]|^2 \tag{9b}$$

For an error correction algorithm with threshold $P_T$, this error can be corrected provided that $P_E < P_T$. Thus the values of f(i) are chosen, for example, to reduce $P_E$ below $P_T$.

An expression for $P_S$ can be derived by evaluating the normalization constant $c_n$ from Equation 8a, and evaluating the inner product in Equation 9a, as given by Equation 10a.

$$P_S = \frac{[|\beta|^2 f(k) + |\alpha|^2 f(k-1)]^2}{[|\beta|^2 f(k)^2 + |\alpha|^2 f(k-1)^2]} \tag{10a}$$

As shown in Equation 3a and 3b, with large enough values for n, k becomes large, on average, and $f(k-1)=f(k)(1-\epsilon(k))$ with arbitrarily small values of $\epsilon(k)$, on average. Substituting from Equation 3b eliminates f(k) and yields Equation 10b $$P_S = \frac{[|\beta|^2 + |\alpha|^2(1-\varepsilon)]^2}{[|\beta|^2 + |\alpha|^2(1-\varepsilon)^2]} \tag{10b}$$

Expanding to second order in $\epsilon$, which is a good approximation when $\epsilon$ is small, and using P0 for the probability that the input qubit is in state |0⟩ (i.e., $P0=|\beta|^2$), and P1 for the probability that the input qubit is in state |1⟩ (i.e., $P1=|\alpha|^2$), yields Equation 10c.

$$P_S = 1 - P0 \, P1 \, \epsilon^2 \tag{10c}$$

Therefore the probability of an error, $P_E$, based on Equation 9b, is given in Equation 10d.

$$P_E = P0 \, P1 \, \epsilon^2 \tag{10d}$$

The average value of $P_E$ can be estimated as follows. The probability of obtaining k photons in the first basis state is represented by the symbol P(k), in which case the average value of $\epsilon^2$ is given by Equation 11a.

$$\text{Average}(\varepsilon^2) = \int_0^n P(k)\varepsilon^2 \, dk \tag{11a}$$

In the limit of large n, the probability P(k) of obtaining k photons in the first basis state is $f(k)^2$. Given the relationship in Equation 3b between $\epsilon$ and df/dk, the derivative of f, Equation 11b results.

$$\text{Average}(\varepsilon^2) = \int_0^n f(k)^2 \varepsilon^2 \, dk = \int_0^n \left(\frac{df}{dk}\right)^2 dk \tag{11b}$$

If it is assumed that P0 and P1 are uniformly distributed between 0 and 1, then the average value of the product P0*P1 is ⅙. Substituting this and Equation 11b into Equation 10d, gives the estimate for the probability of error, $P_E$, in Equation 12.

$$P_E = \frac{1}{6} \int_0^n \left(\frac{df}{dk}\right)^2 dk \quad \text{(for } n \gg 1\text{)} \tag{12}$$

The actual average value of $P_E$ depends on the actual choice for f(i) and therefore the actual values of the derivative, df/dk. For example, a triangular shaped weighting factor f given by Equation 13, with $f_{max}$ selected to satisfy the normalization requirement in Equation 2b, yields $P_E=2/n^2$.

$$f(i)=0 \text{ for } i \leq 0 \tag{13a}$$

$$f(i)=i*2*f_{max}/n \text{ for } 0 < i \leq n/2 \tag{13b}$$

$$f(i)=(n-i)*2*f_{max}/n \text{ for } n/2 < i < n \tag{13c}$$

$$f(i)=0 \text{ for } i \geq n \tag{13d}$$

An optimal choice for f(i) can be found numerically that gives an error rate significantly smaller than this.

For the quantum sign flip described above, separate Fourier transforms are performed on the two separate registers c and c'; and the number of photons in the basis state for each mode l in the c register and mode l' in the c' register are measured as $r_{l \text{ and } r_{l'}}$ respectively, with totals of k and k' respectively. After phase corrections as described in the case for single qubit teleportation, the measurement projects the system into the state represented by the symbol $|\psi_C⟩$ and given by Equation 14a.

$$|\psi_C⟩ = c_n(-1)^{kk'}\{\beta\beta'f(k)\,f(k')|0⟩|0'⟩ + \\ (-1)^{-k}\beta\alpha'f(k)f(k'-1)|0⟩|1'⟩ + (-1)^{-k'}\alpha\beta'f(k-1)f(k')|1⟩|0'⟩ + \\ (-1)^{-k-k'+1}\alpha\alpha'f(k-1)f(k'-1)|1⟩|1'⟩\} \times |y_R⟩|y_{R'}⟩|M⟩|M'⟩ \tag{14a}$$

This state $|\psi_C⟩$ differs from the desired output by various sign factors, which are corrected using linear optics devices, such as one or more Pockels cells, and the observed values k and k'. With these corrections, the system is left in a state represented by the symbol $|\psi_{out}⟩$ and given by equation 14b.

$$|\psi_{out}⟩ = c_n\{\beta\beta'f(k)\,f(k')|0⟩|0'⟩ + \beta\alpha'f(k)f(k'-1)|0⟩|1'⟩ + \\ \alpha\beta'f(k-1)f(k')|1⟩|0'⟩ + \alpha\alpha'f(k-1)f(k'-1)|1⟩|1'⟩\} \times \\ |y_R⟩|y_{R'}⟩|M⟩|M'⟩ \tag{14b}$$

This corresponds to the desired result aside from the factors f of k, k–1, k', and k'–1. The total error rate is the sum of the error rates from the two teleportations in the limit of large n. With the triangular weight factor f given in Equation 13, this yields $P_E=4/n^2$. An optimal choice for f(i) gives an error that is significantly less.

These error analyses show that errors are expected that scale as $1/n^2$ using unequal weighting factors f(i). Thus, these errors decrease faster than the errors in prior techniques and offer high fidelity quantum operations compared to those techniques. These high fidelity techniques offer a better opportunity to be used with general error correction techniques that depend on base error rates lower than a threshold rate $P_T$. For example, if 200 ancilla (n=100) reduces the error $P_E$ below $P_T$ using embodiments of the present invention for single bit teleportation, then the approach of Knill would need to employ about 20,000 ancilla (n=10,000) and hazard the additional costs and errors associated with producing and using so many ancilla. Thus, a potential advantage of high fidelity quantum computations is the use of all outputs and correction of occasional errors with general error correction algorithms.

4. Method for Performing High Fidelity Quantum Operations

FIG. 2 is a flow diagram that illustrates a method 200 for performing high fidelity quantum operations on one or more input qubits, according to an embodiment. Although steps are shown in a particular order in FIG. 2 for the purposes of illustration, in other embodiments, the steps may be performed in a different order or overlapping in time.

In step 202 a superposition state for the ancilla photons is determined to reduce the error rate below some target error rate. This determination depends on the quantum operation to be performed and the target probability of error $P_E$. For purposes of illustration, it is assumed that a high fidelity CNOT is to be performed with an error correction algorithm that has a threshold of $P_T \approx 10^{-4}$, and that $P_E$ for the CNOT device, represented by the symbol $CNOT_E$, is as described above for the quantum sign flip device, e.g., $CNOT_E < 4/n^2$. To satisfy the relationship for $CNOT_E < P_T$, the value of n should be 200 or greater. (It is noted that, to achieve the same threshold for applying the general error correction algorithm with the approach of Knill, which scales as 1/n, would require a value of n of 10,000.) In the illustrated example, therefore, it is determined to use the ancilla state in Equation 5, above, with n=200.

In some embodiments, step 202 includes determining unequal weights, f(i), for each sequence, i, in the set, corresponding to unequal probabilities, $f(i)^2$, for being measured in each sequence, i, in the set. For example, the weights, f(i), of Equation 13 are applied with n=200 and $f_{max}=0.12156$.

In step 210, ancilla photons are generated in an entangled superposition state based on the weights f(i) which are related to the probabilities $f(i)^2$. For example, ancilla photons in 800 spatial modes are generated in the state described in Equation 5 for the entangled registers x, x', y, y' used in the quantum sign flip device within the CNOT device. In embodiments using a first basis state |1] to indicate the presence of a photon and the state |0] to indicate an absence, then there are only 400 photons present (i.e., in state |1]) among the 800 modes for ancilla photons. In the illustrated embodiments, the ancilla are generated in the 800 spatial modes using the source 120 of ancilla photons, and placed in the individual spatial modes 111 of the registers 112, 112', 114, 114'. Details concerning the source 120 of ancilla photons for several embodiments are described in the next section.

In step 220, one or more input qubits are received. For example, in a single bit teleportation device one qubit is received on input qubit spatial mode 102'. In the CNOT device, a target qubit q' is received on input qubit spatial mode 102' and a control qubit q is received on input qubit spatial mode 102.

In step 222, a single qubit operation is performed on one or both input qubits. For example, in the CNOT device, a Hadamard transformation is performed on the target qubit q' using a beam splitter in preprocessor 110'. In some embodiments, step 222 is skipped. For example, in teleportation of one or two qubits, step 222 is skipped.

In step 230, a measurement operation is performed on the input qubits and the photons in the corresponding x registers to determine a location in the corresponding y registers. The state of the input qubit, such as target q' and control q for the CNOT device, are not determined in most embodiments. For example, in sensor 142 of the CNOT device, a Fourier transform, phase shift and measurement of k' is performed on the photons in the c' register made up of the target qubit after the transformation in step 222 and the x' register 112'. In sensor 141 of the CNOT device, step 230 includes performing a second Fourier transform, phase shift and measurement of k on the photons in the c register made up of the control qubit on input spatial mode 102 and the x register 112. The values of k and k' indicate locations in the corresponding y registers, as explained above.

In some embodiments, logical operations are performed on the y registers corresponding to the input qubits. For example, in the CNOT device, the sign of the photons in the y' register 114' are changed based on the values of k and k' measured in sensors 141, 142, as described above in Equations 14a and 14b. In some embodiments, this change is made using one or more Pockels cells in processor 150. In some embodiments, this change is made in output optical coupler 160.

In step 250, a photon in a y register corresponding to the input qubit is selected for output based on the location determined in step 230. For example, in the CNOT device, the photon in the $k^{th}$ spatial mode of y register 114 is selected as the output control qubit $q_{out}$; and the photon in the $k'^{th}$ spatial mode of y' register 114' is selected as the output target qubit $q'_{out}$. In device 103, step 250 is performed by output optical coupler 160 based on values for k and k' passed from sensors component 140 over data line 162.

In step 260 a single qubit operation is performed on one or both output qubits. For example, in the CNOT device, a Hadamard transformation is performed on the output target qubit $q'_{out}$ using a beam splitter in postprocessor 170'. The qubits output on output qubit spatial modes 192, 192' are in a state that represents the result of the quantum CNOT operation. In some embodiments, step 260 is skipped. For example, in teleportation of one or two qubits or in a controlled sign operation, step 260 is skipped.

In step 262, the qubit output on spatial mode 192' is not blocked based on measurements of the ancilla photons, such as measurements k or k', as performed in the Knill approach. Instead, the output on spatial mode 192' is always used. General error correction algorithms handle errors in the output on spatial mode 192'. For example, an error in the output on spatial mode 192' from the CNOT device occurs at a rate less than $10^{-4}$ because n=200 (400 photons in state |1] among 800 ancilla photons spatial modes among registers 112, 112', 114, 114') so the general error correction algorithm with $P_T = 10^{-4}$ can be employed. To achieve the same low error rate with the Knill approach would require n=10,000 (20,000 photons in state |1] among 40,000 ancilla spatial modes). In some embodiments, step 262 is skipped.

5. Sources for Entangled Ancilla Photons

Any method known in the art at the time an embodiment is implemented may be used as a source 120 to generate the ancilla photons in the entangled states. As pointed out above, probabilistic devices that produce photons in desired states only a part of the time, which is determined based on measurements, can be used in source 120 to generate entangled ancilla photons. Probabilistic devices have been described by Knill, Koashi and Pittman I.

In this section several embodiments for source 120 are described, including an optical source and a solid state source.

5.1 Optical Source for Entangled Ancilla Photons

FIG. 3A is a block diagram that illustrates a first portion of a source 320 of entangled ancilla photons interacting with x register 312, y register 314, x' register 312', and y' register 314', according to an embodiment. In some embodiments, x register 312 and y register 314 are omitted and the optical connections shown in FIG. 3A apply only to the retained registers 312', 314'. In other embodiments more or fewer spatial modes are included in the registers, e.g., n≠5. In this embodiment, the basis states of the ancilla photons are state |1] indicating a photon present in a spatial mode and a state |0] indicating no photon is in the spatial mode, corresponding to logical values 1 and 0. In these embodiments, a CNOT with error less than $10^{-4}$ can be implemented with n=200, which implies 400 photons in state |1] spread among 800 spatial modes. In some such embodiments, source 320 produces only the 400 photons in state |1] and need not produce any of the 400 photons in state |0].

Although embodiments are shown in FIG. 3A and following figures with the primed and unprimed x and y registers 312, 312', 314, 314' repeatedly used to store intermediate results, in other embodiments, different registers of spatial modes corresponding to these registers are used to hold one or more intermediate results, and the actual primed and unprimed x and y registers 312, 312', 314, 314' are used only to hold the final results. In some embodiments, some combination of these primed and unprimed x and y registers 312, 312', 314, 314' and different registers are used to hold intermediate results.

In the first portion of source 320, ancilla photons in the first basis state are provided to each spatial mode in the y' register 314', and, if present, to the y register 314. Any method for providing ancilla photons in the first basis state may be used. For convenience in the following description, interactions with the y' register, or both the y' register and the y register, are described using the unprimed register.

In the illustrated embodiment, the first portion of source 320 includes an array of certain sources of single photons on demand 310a, 310b, and ellipsis 310c indicating additional sources, collectively referenced hereinafter as certain sources 310, as described in Pittman II. As described in Pittman II, each source 310 provides a single photon with near certainty on demand with a time resolution based on a time to circuit an optical loop included in the source. Embodiments described in Pittman II include a 13.3 nanosecond (ns, 1 ns=$10^{-9}$ seconds) time to circuit the optical loop. After discharge, the source can be recharged with another photon within a recharge time. In some embodiments, each spatial mode in each y register is connected to a separate source 310.

As described in Pittman II, each source includes a pulsed down conversion (PDC) source of a pair of photons (e.g. PDC source 302 in source 310a). The PDC source 302 produces the pair of photons at an uncertain time during the recharge time. When a pair is emitted, one photon of the pair is detected by a detector in a controller such as an electronic controller (e.g., controller 303 in source 310a). When the first photon is detected, the controller sets a switch, such as by setting an electric state of an electro-optic switch (e.g., EO switch 306), in an optical loop (e.g., optical loop 304) to capture the second photon to propagate repeatedly in the optical loop 304 until demanded. When a demand is received by the controller, the controller resets the switch, such as by setting another electrical state, to release the photon to the output of source 310. In this way a single photon is known to be in the optical loop 304 by the controller 303. The controller can signal a central processor (not shown) in the source 320 of ancilla photons, so the central processor can determine when all the sources 310 have stored photons that can be output to the y registers. For example, in the CNOT device with n=200, 400 certain sources 310 of single photons are included in source 320. The output of 200 sources 310 are input to spatial modes of the y register 314; and the output of a different 200 sources 310 are input to spatial modes of the y' register 314'.

FIG. 3B is a block diagram that illustrates a second portion of a source 320 of entangled ancilla photons, according to an embodiment. The components of the second portion of source 320 include spatial modes 326a, 326b, 326c, 326d, 326e, 326f, beam splitters 322a, 322b, mirrors 321a, 321b, and a controlled phase shifter. The controlled phase shifter includes probabilistic CNOTs 324a, 324b, π phase shifter 323, and spatial modes 327a, 327b, 327c.

In this portion of source 320, probability amplitude from state |1] photons in some spatial modes of the y registers are conditionally transferred to a corresponding spatial mode in the associated x registers. The operation of the second portion of source 320 is described in terms of the conditional transfer of a state |1] photon in the $1^{st}$ and $2^{nd}$ spatial modes of y register 314 into the $1^{st}$ and $2^{nd}$ spatial modes of x register 312. It should be noted that these operations are performed without measuring or otherwise collapsing the quantum state of the primed and unprimed registers, thereby enabling the desired ancilla superposition state to be built up through successive operations. Similar operations are performed for the other spatial modes of y register 314 and for y' register 314', as explained below.

First, the state |1] photon in the $1^{st}$ spatial mode of the y register is transferred to the $1^{st}$ spatial mode of the x register with a probability of occurrence equal to the probability $P_1$ of a state |1] photon in the first mode for all sequences j. This is given by Equation 15.

$$P_1 = \Sigma_{j=1,n} f(j)^2 = 1 - f(0)^2 \qquad (15a)$$

Any method known in the art may be used. In the illustrated embodiment, such a probabilistic transfer is accomplished with an interferometer including the beam splitters 322a, 322b and the controlled phase shifter, as described below.

The state |1] photon in the $i^{th}$ ($2^{nd}$ or subsequent) spatial mode of the y register is transferred to the $i^{th}$ ($2^{nd}$ or subsequent) spatial mode of the x register with a probability of occurrence equal to the probability $P_i$ of all sequences having a |1] state photon in the $i^{th}$ spatial mode, given that a photon in state |1] occupies the first i-1 spatial modes of the x register. This probability is given by Equation 15b.

$$P_i = \Sigma_{j=i,n} [f(j)^2 / \{\Sigma_{j'=j=1,n} f(j')^2\}] \qquad (15b)$$

Any method known in the art may be used. In the illustrated embodiment, such a probabilistic transfer is accomplished with an interferometer including the beam splitters 322a, 322b and the controlled phase shifter.

The functioning of the interferometer can be explained as follows. The following theoretical descriptions are presented in order to better understand the operation of the interferometer. However, embodiments of the invention are not limited by the theory or theories presented here, or by estimates of probability based on these descriptions. A single state |1] photon on spatial mode 326a and a photon in state |0] on spatial mode 326b are incident on beam splitter 322a, e.g., no photon is present on mode 326b. Beam splitter 322a combines these incident spatial modes to produce photons on two output spatial modes 326c, 326d. A controlled phase shifter inserts a phase shift of φ on a photon in mode 326d. Spatial modes 326c and spatial mode 326d are incident on beam splitter 322b. Beam splitter 322b combines these incident spatial modes to produce photons on its two output spatial modes 326e, 326f.

Using standard quantum optics notation, single photons in spatial modes 326a, 326b, 326c, 326d, 326e, 326f are said to be created by operators $a^†$, $b^†$, $c^†$, $d^†$, $e^†$, $f^†$, respectively. The value inside the brackets indicates the number of photons in a spatial mode when the operator operates. Since ancilla have no more than one photon in a spatial mode, the creation operator on modes included in the ancilla should operate on mode |0]. The incident state |ψ] can be expressed in this notation as given by Equation 16a.

$$|\psi] = a^† |0] \qquad (16a)$$

The beam splitter 322a applies the operator transformations given by Equations 16b, 16c:

$$a^\dagger \to T\, d^\dagger + R\, c^\dagger \tag{16b}$$

$$b^\dagger \to T\, c^\dagger + i R\, d^\dagger \tag{16c}$$

where R and T are coefficients of reflection and transmission, respectively, of the beam splitter 322a. The transformation in Equation 16b can be read to state that a single photon in mode 326a is transmitted into mode 326d with a probability related to T and is reflected with a phase change into spatial mode 326c with a probability related to R. By definition $R^2 + T^2 = 1$. The controlled phase shifter applies the transformation given by Equation 16d.

$$d^\dagger \to \exp(i\, \phi) d^\dagger \tag{16d}$$

The controlled phase shifter is operated to shift phase by either $\phi = 0$ or $\phi = \pi$ radians (i.e., 0 or 180 degrees). A phase shift of $\pi$ radians is equivalent to a sign change to the amplitude of the first basis state, state |1]. After the phase change, if any, in the controlled phase shifter, beam splitter 322b applies the operator transformations given by Equations 16e, 16f.

$$c^\dagger \to T\, f^\dagger + i R\, e^\dagger \tag{16e}$$

$$d^\dagger \to T\, e^\dagger + i R\, f^\dagger \tag{16f}$$

Combining these transformations in the standard way generates an output state, represented by the symbol $|\psi_{out}]$ and given by Equations 16g, 16h.

$$|\psi_{out}] = -e^\dagger |0] \text{ for } \phi = \pi \text{ radians} \tag{16g}$$

$$|\psi_{out}] = \{-(1-2T^2)e^\dagger + 2iRT\, f^\dagger\}|0] \text{ for } \phi = 0 \text{ radians} \tag{16h}$$

Equation 16g shows that the photon incident on spatial mode 326a in state 1] is always output alone onto spatial mode 326e, if $\phi = \pi$ radians. Equation 16h shows that the photon incident on spatial mode 326a in state |1] is output alone onto spatial mode 326f with a probability of $(2RT)^2$ if $\phi = 0$ radians. That is, the probability $P_{af}$ that the photon incident on spatial mode 326a in state |1] is output to spatial mode 326f in state |1] is given by equations 16i, 16j.

$$P_{af} = 0 \text{ for } \phi = \pi \text{ radians} \tag{16i}$$

$$P_{af} = |(2iRT)^2| = 4R^2T^2 = 4(1-T^2)T^2 \text{ for } \phi = 0 \text{ radians} \tag{16j}$$

In the illustrated embodiment, the state [1] photon in the $1^{st}$ spatial mode of the y register is transferred to the $1^{st}$ spatial mode of the x register by: 1) controlling the phase shifter to impart no phase shift; 2) selecting the value of T so that $Paf = P_1$, given by Equation 15, for the weighting factors f used in the device; 3) directing the photon in the $1^{st}$ spatial mode of the y register onto spatial mode 326a; 4) directing the output photon state in the spatial mode 326f into the $1^{st}$ spatial mode of the x register; and 5) directing the output photon state in the spatial mode 326e back into the $1^{st}$ spatial mode of the y register.

The conditional transfer of a state |1] photon in the $2^{nd}$ (and any subsequent) spatial mode of y register 314 into the $2^{nd}$ spatial mode of x register 312 (and any subsequent spatial mode in x register) is dependant on whether the immediately preceding spatial mode in the x register has a photon in state |1]. If not, then photons in the $2^{nd}$ and subsequent spatial modes are not transferred to the x register. In the illustrated embodiment, the state |1] photon in the $i^{th}$ ($2^{nd}$ or subsequent) spatial mode of the y register is transferred to the $i^{th}$ ($2^{nd}$ or subsequent) spatial mode of the x register by: 1) controlling the phase shifter to impart no phase shift if there is a photon in state |1] in the preceding spatial mode (i-1) of the x register—but controlling the phase shifter to impart a $\pi$ radians phase shift if there is not; 2) selecting the value of T so that $Paf = P_i$, the probability of having a photon in state |1] in the $i^{th}$ spatial mode given a photon in the $(i-1)^{th}$ spatial mode, described by Equation 15b; 3) directing the photon in the $i^{th}$ spatial mode of the y register onto spatial mode 326a; 4) directing the output photon state in the spatial mode 326f into the $i^{th}$ spatial mode of the x register; and 5) directing the output photon state in the spatial mode 326e back into the $i^{th}$ spatial mode of the y register.

For the $i^{th}$ spatial mode of the y register (where $i \geq 2$), the controlled phase shifter is configured so that no phase shift is applied if there is a state |1] photon in the (i-1) spatial mode of the x register.

Any method known in the art for implementing a controlled phase shifter may be used. In the illustrated embodiment, the controlled phase shifter includes a probabilistic CNOT 324a with a control qubit supplied on spatial mode 327a, a $\pi$ radians phase shifter 323 that applies a phase shift of $\pi$ radians, another probabilistic CNOT 324b with a control qubit supplied on spatial mode 327b, and a control qubit output spatial mode 327c. The functioning of the illustrated controlled phase shifter can be explained as follows. The following theoretical descriptions are presented in order to better understand the operation of the controlled phase shifter. However, embodiments of the invention are not limited by the theory or theories presented here.

In the illustrated embodiment, the $\pi$ radians phase shifter is a birefringement medium that applies a phase shift of $\pi$ radians to a photon in state |1] but does not affect a photon in state |0]. This is easy to understand because a photon in state |0] does not propagate through the birefringement medium. In the illustrated embodiment, the CNOTs 324a, 324b are probabilistic linear optics devices as described in Pittman I; in other embodiments other CNOTs are used for either or both CNOTs 324a, 324b. The CNOTs of Pittman I succeed with a probability of ¼ and use polarization states of single photons. As described above, it is well known in the art how to convert qubits based on states |1], |0] representing the presence or absence of a photon in a spatial mode back and forth to qubits based on states |H], |V] representing the directions of polarization. Therefore it is clear to one skilled in the art how to use the CNOT of Pittman I with the qubits in states |1] and |0].

For purposes of illustration, the operation of the controlled phase shift is described for the conditional transfer of the state |1] photon in the $2^{nd}$ spatial mode of the y register to the $2^{nd}$ spatial mode of the x register. For this process, the control qubit spatial mode 327a is optically connected to the $1^{st}$ spatial mode in the x register, representing the (i-1) spatial mode.

If the $1^{st}$ spatial mode in the x register holds a photon in state |1] then the control qubit on spatial mode 327a causes the CNOT 324a to flip the |0] and |1] states of a photon entering the CNOT 324a on spatial mode 326d. This causes a photon in state |1] to be flipped to state |0]. The photon in state |0] is not affected by the birefringement material in $\pi$ phase shifter 323, so its phase is not shifted. The control qubit on spatial mode 327a is passed to spatial mode 327b. The control qubit on mode 327b causes the CNOT 324b to flip the |0] and |1] states of a photon entering the CNOT 324b on spatial mode 326d. Thus the photon in state |0] is flipped back to state |1]. This photon continues to beam splitter 322b without having its phase shifted. Thus, Equation 16h above, applies and beam splitter 322b reflects or transmits a photon in state |1] to spatial mode 326f in state |1] according to the desired probabilities. If output onto spatial mode 326f in state |1], then a photon in state |1] is transferred to the $2^{nd}$ spatial mode of the x register, as desired.

If the $1^{st}$ spatial mode in the x register holds a photon in state |0] then the control qubit on spatial mode 327a causes the CNOT 324a to not flip the |0] and |1] states of a photon entering the CNOT 324a on spatial mode 326d. This causes a photon in state to remain in state |1]. The photon in state |1] is phase shifted π radians by the birefringence material in π phase shifter 323. The control qubit on spatial mode 327a is passed to spatial mode 327b. The control qubit on mode 327b causes the CNOT 324b to not flip the |0] and |1] states of a photon entering the CNOT 324b on spatial mode 326d. Thus the phase shifted photon in state |1] is output by CNOT 324b. Thus, Equation 16g above, applies and beam splitter 322b transmits an incident photon in state |1] to spatial mode 326e in state |1]. In this case, the photon is never transferred to spatial mode 326f or the $2^{nd}$ spatial mode of the x register. Instead, the photon is returned to it's original mode in the y register, as desired, such as to the $2^{nd}$ spatial mode in the y register in the illustrated embodiment.

In some embodiments, a separate interferometer, as described above, is included in the source 320 for every spatial mode in the y register. In some embodiments a single interferometer is used for more than one spatial mode in the y register.

After operation by the interferometers, the x' and y' registers 312', 314' are entangled with each other according to Equation 2a; and, if present, the x and y registers 312, 314 are entangled with each other according to Equation 4. However the primed registers 312', 314' are not entangled with the unprimed registers 312, 214.

Figure 3C:
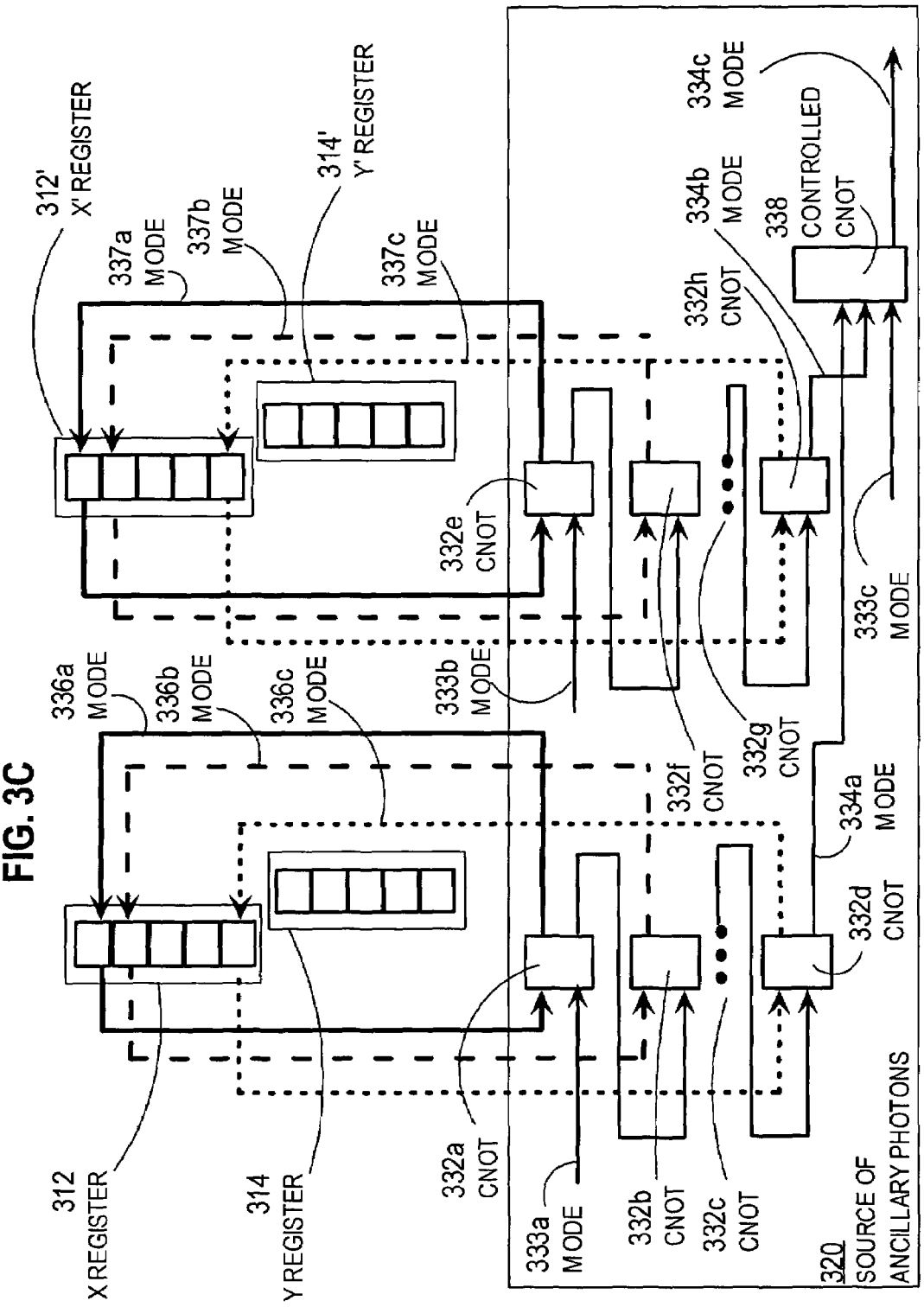
FIG. 3C is a block diagram that illustrates a third portion of a source of entangled ancilla photons, according to an embodiment.

FIG. 3C is a block diagram that illustrates a third portion of a source 320 of entangled ancilla photons, according to an embodiment. Structures depicted in the third portion are included in embodiments of the high fidelity sign flip and CNOT devices that use entangled ancilla photons in the state given by Equation 5.

Equation 5 involves changing the sign of the state |1] photons in the primed x' and y' registers 312', 314' depending on the sequences j', j generated for the primed and unprimed registers. That is, Equation 5 involves multiplying the quantum state of the primed registers by the factor $(-1)^{jj'}$. Once again, the actual values j and j' must not be determined, because that amounts to measuring the input qubits once k is measured.

If the product jj' is even, no change is made to the ancilla photons in the primed registers; if the product is odd, the sign of the state in the primed registers are changed.

The product jj' is even if either j or j' is even, and is odd only if both j and j' are odd. Thus it is sufficient to determine the parity of the sequences used and the actual indexes need not be determined. The value of j is related to the number of state |1] photons in the x register 312; and the value of j' is related to the number of state |1] photons in the x' register 312'. Thus, it is sufficient to determine the parity of the two x registers to determine whether to change the signs in the primed registers.

The third portion of source 320 includes probabilistic CNOT devices 332a, 332b, 332d, 332e, 332f, 332h and ellipsis 332c, 332g representing multiple other CNOT gates, collectively referenced hereinafter as CNOT devices 332. The third portion also includes spatial modes 333a, 333b, 333c, 334a, 334b, 334c, 336a, 336b, 336c, 337a, 337b, 337c for carrying photons in either state |0] or state |1]. The third portion also includes a probabilistic controlled CNOT (CCNOT) 338.

In the approach illustrated in FIG. 3C, two additional ancilla photons are generated, denoted by symbols $q_a$ and $q_b$, on spatial modes 333a, 333b, respectively. These photons $q_a$, $q_b$ are used to determine the parity of the x register 312 and the x' register 312', respectively. The states of ancilla photons $q_a$, $q_b$ are repeatedly flipped using the CNOTs, based on the state of the modes in the x registers. If $q_a$ or $q_b$ is flipped an even number of times, it ends up in its original state. If flipped an odd number of times, it ends up in a flipped state. In the illustrated embodiment, the initial state of $q_a$ and $q_b$ photons are in state |0], so a final state of |0] indicates an even parity for the corresponding x register, while a final state of |1] indicates an odd parity. The determination of the parity of the x register is described first.

Photon $q_a$ on mode 333a is input as the target qubit of the CNOT gate 332a, and the photon in the $1^{st}$ spatial mode of the x register 312 is directed to mode 336a as the control qubit. The control qubit is returned on spatial mode 336a to its original spatial mode in the x register 312. If the $1^{st}$ spatial mode of the x register 312 is in state |1], $q_a$ is flipped to the state |1]. If the $1^{st}$ spatial mode of the x register 312 is in state |0], $q_a$ is not flipped but remains in the state |0]. The output $q_a$ in either state is input as the target qubit in CNOT 332b. Similarly, the photon in the $2^{nd}$ spatial mode of the x register 312 is directed to mode 336b as the control qubit for CNOT 332b. The control qubit is returned on spatial mode 336b to its original spatial mode in the x register 312. If the $2^{nd}$ spatial mode of the x register 312 is in state |1], $q_a$ is flipped. If the $2^{nd}$ spatial mode of the x register 312 is in state |0], $q_a$ is not flipped but remains in the state it had when it entered the CNOT 332b.

The process is repeated through CNOTs 332c, to CNOT 332d associated with the last spatial mode in x register 312, with the $q_a$ photon output by one CNOT gate input as the target qubit of the next CNOT gate. At CNOT 332d, the control qubit is directed onto mode 336c from the last spatial mode in the x register 312 and returned in mode 336c to its original spatial mode in x register 312. It is noted that, for the sequences used in Equation 5, once one spatial mode in the x register is in state |0], all the remaining spatial modes are also in the state |0] and the state of $q_a$ is not flipped in the remaining CNOTs. On CNOT output spatial mode 334a, $q_a$ has a state that reflects the parity of the sequence j in x register 312. If the parity of j is odd, $q_a$ is in state |1] on spatial mode 334a.

Similarly, photon $q_b$ is input on spatial mode 33b in state |1] as the target qubit on CNOT 332e. The control qubit is directed onto mode 337a from the $1^{st}$ spatial mode of x' register 312' and returned there after passing through CNOT 332e. The photon $q_b$ is successively passed through CNOT 332f, with control qubit directed onto mode 337b from the $2^{nd}$ spatial mode of x' register 312', through CNOTs 332g, to the last CNOT 332h, with control qubit directed onto mode 337c from the last spatial mode of x' register 312'. On CNOT output spatial mode 334b, $q_b$ has a state that reflects the parity of the sequence j' in x' register 312'. If the parity of j' is odd, $q_b$ is in state |1] on spatial mode 334b.

To determine the parity of the product jj', a third ancilla photon, $q_c$, in state |0] is generated on spatial mode 333c. Photons $q_a$, $q_b$ are used as control qubits and $q_c$ is used as the target qubit on the CCNOT 338.

The function of a controlled-controlled not (controlled CNOT, or CCNOT) is to flip values of the two components of the target qubit if both control qubits would be measured in the 1 state, and to do nothing if either control qubit is in the 0 state. A probabilistic CCNOT can be implemented in any manner known in the art. In an illustrated embodiment, the CCNOT is implemented using multiple CNOTs described in Pittman I.

The CCNOT 338 generates an output $q_c$ on mode 334c with a state that is |1], indicating that the product jj' is odd, only if both $q_a$ and $q_b$ are in state |1]. If CCNOT 338 generates an output $q_c$ on mode 334c with a state that is |0], indicating that the product jj' is even, then no further changes are made to the ancilla photons in the primed and unprimed x and y registers 312', 314', 312, 314.

In other embodiments, ancilla photons $q_a$, $q_b$, $q_c$ are in one of two polarization states so that they can be used in probabilistic CNOTs 332 without conversion to polarization states, and only the photons from the primed and unprimed x registers 312', 312 are converted to polarization states to operate as control qubits in the CNOTs. In some embodiments, the result on mode 334c is converted to states |0], |1]. In some embodiments the result on mode 334 is retained in polarization states.

Figure 3D:
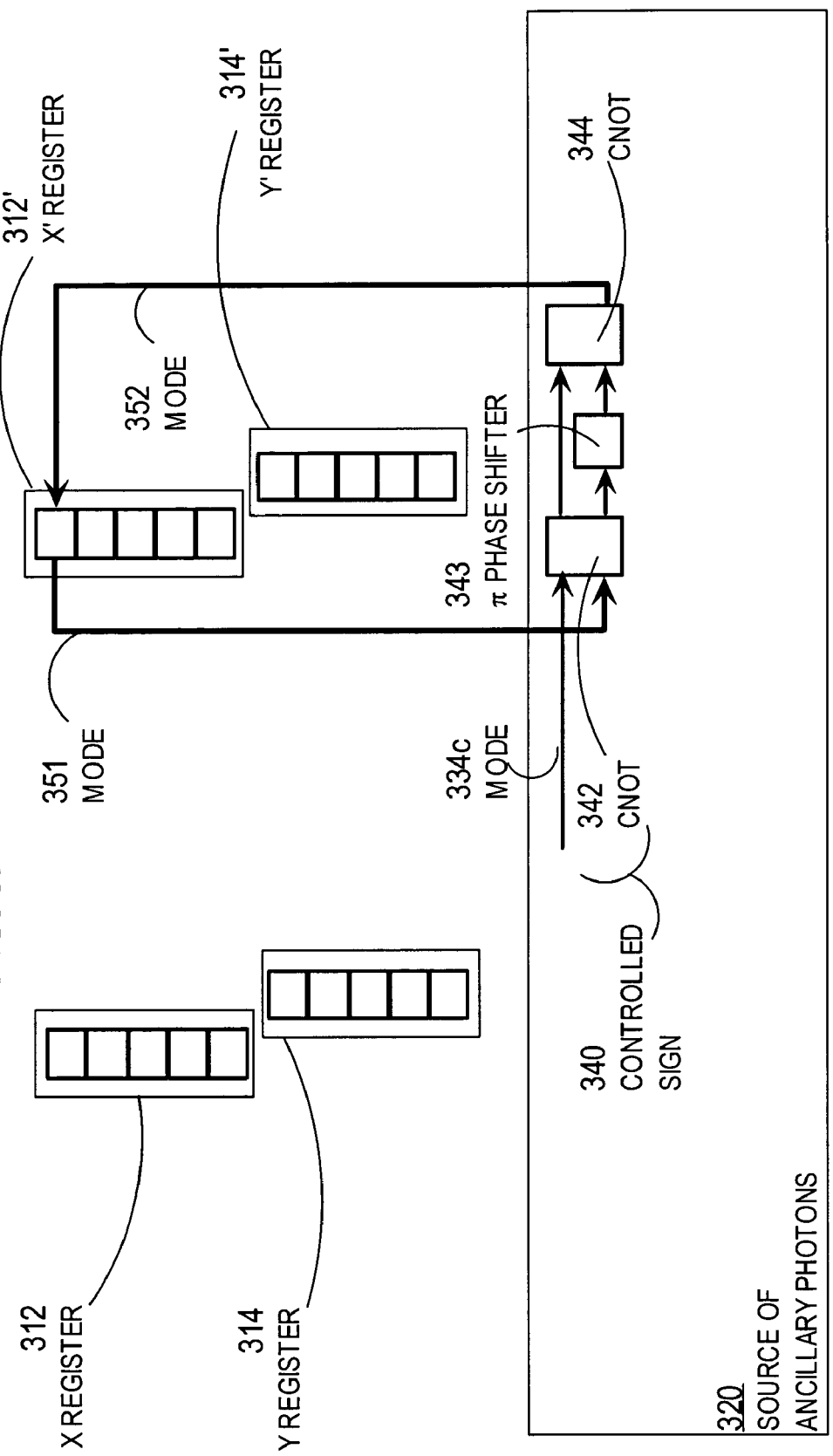
FIG. 3D is a block diagram that illustrates a fourth portion of a source of entangled ancilla photons, according to an embodiment.

FIG. 3D is a block diagram that illustrates a fourth portion of a source 320 of entangled ancilla photons, according to an embodiment. Structures depicted in the fourth portion are included in embodiments of the high fidelity sign flip and CNOT devices that use entangled ancilla photons in the state given by Equation 5. These structures change the sign of the ancilla sequences in the x and y registers for those sequences in which $q_c$ on spatial mode 334c would be measured to be in state |1].

The fourth portion of source 320 includes a controlled sign device 340 and spatial modes 351 and 352.

In the illustrated embodiment, the controlled sign device controllably changes the sign of each sequence in the ancilla state simultaneously by controllably applying a phase shift of either π radians to change the sign of a state |1] photon in the $1^{st}$ spatial mode of the x' register or 0 radians to leave the sign unchanged. Note that conditionally applying a phase shift to only one photon of a sequence affects the phase of the entire sequence in the resulting superposition state.

Photon $q_c$ on spatial mode 334c, is used as the control qubit for the controlled sign device 340. The target qubit on the controlled sign is an ancilla photon from the $1^{st}$ spatial mode of the x' register 312'. The target photon from the $1^{st}$ spatial mode of the x' register is directed to spatial mode 351 to be input as the target qubit for the controlled sign device 340. The resulting photon is returned along spatial mode 352 to the $1^{st}$ spatial mode of the x' register.

In this embodiment, the same components are used as shown in spatial mode 326d to controllably change the phase of a photon in an interferometer depicted in FIG. 3B. In the illustrated embodiment, the controlled sign 340 includes CNOT 342, π phase shifter 343, and CNOT 344.

The phase of the resulting ancilla sequence is changed in sign (shifted by π radians) if the target and $q_c$ both correspond to the state |1]. If either would be found in state |0], no change is made to the sign (the phase shift is 0 radians). This is accomplished, for example, in the controlled sign device 340. The following theoretical descriptions are presented in order to better understand the operation of the controlled sign device. However, embodiments of the invention are not limited by the theory or theories presented here. If $q_c$ on spatial mode 334c is in state |1], then the state of the photon in the $1^{st}$ spatial mode of the x' register, input along spatial mode 351, is flipped in CNOT 342. Thus a target photon originally in state |1] in the $1^{st}$ spatial mode is swapped to state |0]. In this embodiment, the π phase shifter 343 is configured to apply a π phase shift to target photons in the |0] state, and no phase shift to target photons in the |1] state. The target qubit is then conditionally flipped back to its original basis state by CNOT 344 prior to being returned to the $1^{st}$ mode of the x' register via mode 352.

In some embodiments it is necessary to return the three extra ancilla, $q_a$, $q_b$, and $q_c$ to their initial values, all |0], in order to avoid unwanted entanglement with the primed and unprimed ancilla registers. This can be implemented in any manner known in the art. In one embodiment, the third portion of source 320 shown in FIG. 3C can be duplicated, or reused to accomplish this by repeating the CCNOT process equivalent to Controlled CNOT 338 prior to the application of the 2n CNOTs; 332a, 332b, 332c, 332d, 332e, 332f, 332g, 332h, or their equivalent.

Using the source 320, ancilla photons in the desired entangled states, given by Equations 2a, 4 or 5, can be produced.

5.2 Solid State Source for Entangled Ancilla Photons

Figure 4:
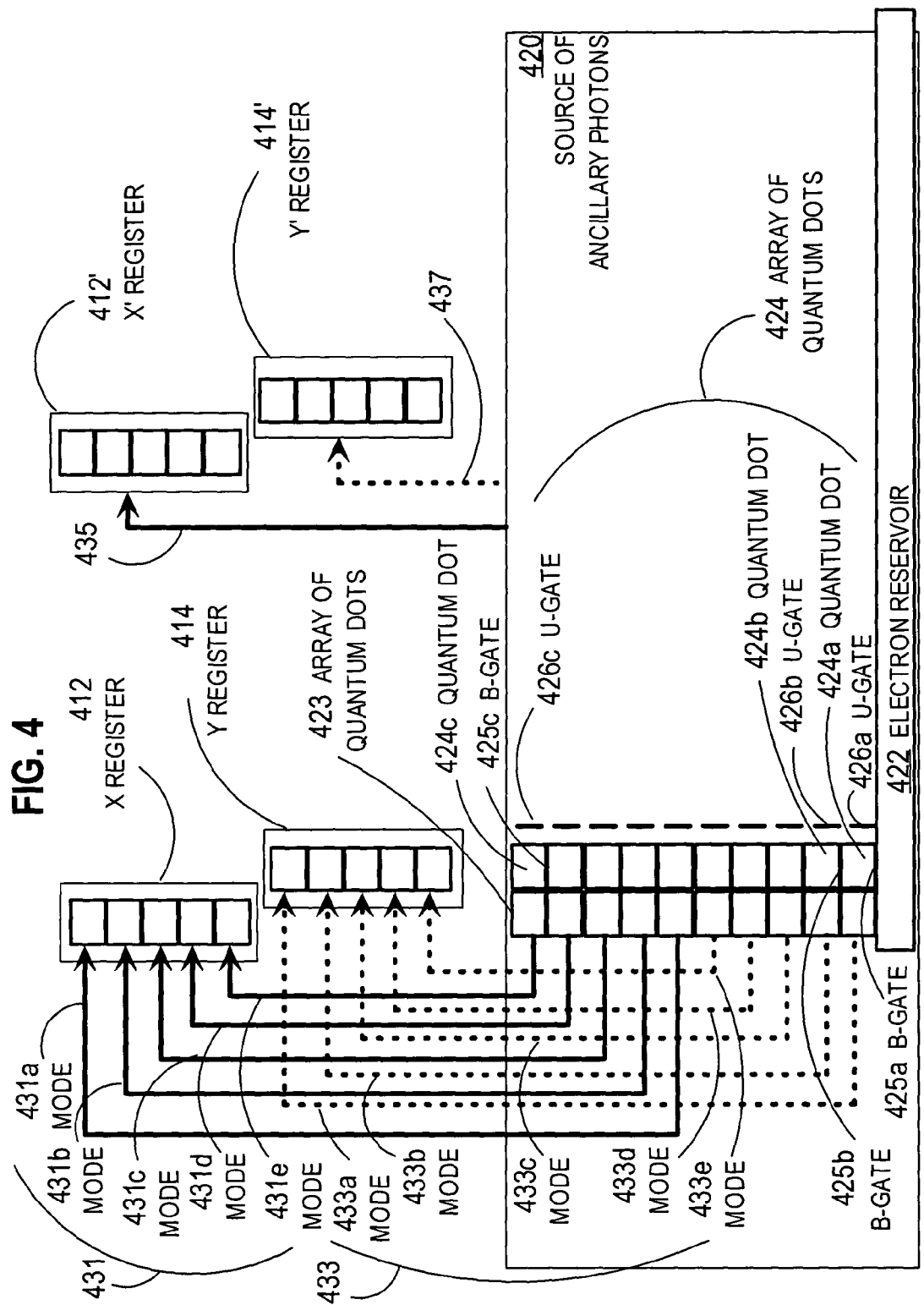
FIG. 4 is a block diagram that illustrates a source of entangled ancilla photons, according to another embodiment.

FIG. 4 is a block diagram that illustrates a source 420 of entangled ancilla photons, according to another embodiment, using solid state quantum states. Source 420 includes an array 424 of quantum dots. A quantum dot is an atom, ion or molecule with two or more discreet excited energy states for a bound electron above a ground state. The discreet energy states at each dot are controlled by a U-gate that produces an electrostatic potential across the dot. Electrons bound at one dot can jump to an adjacent dot with a probability that depends on a tunneling energy threshold and time. The tunneling energy threshold is controlled by a B-gate. Excited electrons to occupy the discreet excited energy states are available in a thermal reservoir. In the illustrated embodiment, a second array 423 of quantum dots is included in source 420.

As shown in FIG. 4, the solid state source 420 of entangled photons includes a reservoir 422 of thermally excited electrons, and a linear array 424 of 2n quantum dots at increasing distance from the reservoir 422. In the illustrated embodiment n=5. Each quantum dot in the array 424 is accompanied by a B-gate and a U-gate. For example, quantum dot 424a is accompanied by B-gate 425a and U-gate 426a. Similarly, quantum dot 424b is accompanied by B-gate 425b and U-gate 426b; and quantum dot 424c is accompanied by B-gate 425c and U-gate 426c. Although shown next to the quantum dots in FIG. 4, in other embodiments the U-gates may be disposed above or below the quantum dots. Furthermore, in other embodiments, more or fewer quantum dots populate quantum dot array 424, e.g., for different values of n.

The source 420 includes optical spatial modes 431 connecting a first contiguous portion of the array 423 of quantum dots to the x register, and optical spatial modes 433 connecting a second contiguous portion of the array 423 to the y register. Spatial modes 431 includes single photon spatial modes 431a, 431b, 431c, 431d, 431e; and spatial modes 433 includes single photon modes 433a, 433b, 433c, 433d, 433e. A similar arrangement of modes 435, 437 connects to the primed registers 412', 414'. In some embodiments, the modes 435, 437 connected to the primed registers originate in one or more additional arrays of quantum dots (not shown) similar to the arrangement of the arrays 423 or 424 or both.

The quantum dot array 424 is configured to generate an entangled state of 2n qubits represented by n excited electrons among the 2n dots, where the presence of an excited electron at a quantum dot represents state |1] and the absence represents state |0]. The U-gates are operated to create a discreet excited state that allows the emission of a single photon of an appropriate wavelength into a single mode optical fiber when the excited electron decays to a lower state. Thus the sequence of 2n entangled states can be transferred to photons in corresponding states |1⟩ and |0⟩ if the optical coupling is sufficiently efficient. In order to avoid the emission of a photon during a time when the electron states are being prepared, in the illustrated embodiment, the array 424 is not directly coupled to the optical fibers. Instead, after the sequence of entangled states is generated in array 424, the U-gates and B-gates are operated, in a manner well known in the art, to simultaneously transfer the excited electrons in the array 424 to the corresponding dots in array 423. The quantum dots in array 423 are coupled to the optical fibers that provide spatial modes 431 and 433.

In an illustrated embodiment, the source 420 is operated as described next. For convenience in the following description, the quantum dot positions in array 423 and 424 are labeled from D1, at the quantum dot farthest from the reservoir 422 (e.g., quantum dot 424c), to D2n at the quantum dot closest to the reservoir 422 (e.g., quantum dot 424a). In the illustrated embodiment, n=5 and the quantum dot 424a has label D10. Similarly, the B-gates are labeled B-gate 1 through B-gate 10 and the U-gates are labeled U-gate 1 through U-gate 10, proceeding from farthest to closest to the reservoir 422. The quantum dots that correspond to the primed or unprimed x registers are in positions D1 through Dn and are called collectively the XD register. The quantum dots that correspond to the primed or unprimed y registers are in positions D(n+1) through D2n and are called collectively the YD register.

The array of quantum dots work to produce a contiguous line of excited electrons, as is described below, which produces a contiguous portion of the array 423 in electron state |1⟩ between two portions of arbitrary lengths in electron state |0⟩. As described above, the desired fundamental sequences defined in Equation 1 have the opposite, i.e., a contiguous portion of n states in the combined x and y registers in photon state |0⟩ between two portions of arbitrary lengths in photon state |1⟩. The transformation can be done in any manner known in the art. For example, CNOT gates can be used to flip the photon states produced. In the illustrated embodiments, the spatial modes 431, 433 are arranged to flip the order of photons directed to the x register 412 from the $x_D$ register, and to flip the order of photons directed to the y register 414 from the $y_D$ register, as described for an example below. The spatial modes 435, 437 are similarly arranged to flip the order of photons directed to each of the x' register 412' and the y' register 414'.

First, all the quantum dots in array 424 are placed in electron state |0⟩. Any method known in the art may be used. In an example embodiment, the electrostatic potential of the U-gates is increased and the tunneling threshold of the B-gates is reduced to allow the entire array 424 to reach thermal equilibrium with the reservoir 422.

Next, a single excited electron is transferred from the reservoir to the quantum dot nearest the reservoir, e.g. D10, using standard techniques well known in the art. In these techniques, the height of the tunneling threshold for B-gate 10 425a is reduced and the two regions are coupled for a time interval $t_C$ chosen to produce a complete Rabi oscillation. The transfer of two electrons in this process is prohibited by energy conservation, as is well known in the art. Similar complete Rabi oscillations can then be used successively to transfer single electrons to the entire $y_D$ register, for example by successively reducing the tunneling threshold for the corresponding B-gates, B-gate 9 through B-gate 6. After this process, all the electron states in the $y_D$ register have the value |1⟩. Table 3 shows the states of the quantum dots after intermediate steps for n=5. The state after loading excited electrons into the $y_D$ register is shown in Table 3 in the first row, labeled step 1.

TABLE 3

Example intermediate sequences of electron states in array of quantum dots.

| step | $x_D$ D1 | $x_D$ D2 | $x_D$ D3 | $x_D$ D4 | $x_D$ D5 | $y_D$ D6 | $y_D$ D7 | $y_D$ D8 | $y_D$ D9 | $y_D$ D10 |
|---|---|---|---|---|---|---|---|---|---|---|
| 1 | 0 | 0 | 0 | 0 | 0 | 1 | 1 | 1 | 1 | 1 |
| 2 | 0 | 0 | 0 | 0 | 1 | 0 | 1 | 1 | 1 | 1 |
| 3 | 0 | 0 | 0 | 0 | 1 | 1 | 1 | 1 | 1 | 0 |
| 4 | 0 | 0 | 0 | 1 | 1 | 1 | 1 | 1 | 0 | 0 |

After the $y_D$ register is filled with single excited electrons, the next step is to reduce the height of the tunneling threshold between D5 and D6 and perform a partial Rabi oscillation for a time t1. The threshold and t1 are selected so that an electron is transferred from D6 to D5 with a probability $P_1$ given by Equation 15a. If the transfer does not occur, the sequence of states is final, i.e., the sequence j=0 is selected. If the transfer occurrs, then the dots in array 424 are in states as listed in the row of Table 3 labeled step 2. This and subsequent transfers are performed without determining if the transfers take place, culminating in a quantum dot array in a superposition state of the desired sequences.

The next step is to perform a sequence of complete Rabi oscillations between successive quantum dots in array 424 at locations between the potentially transferred electron and D2n, i.e., between D6 and D7, then between D7 and D8, etc, and finally, between D9 and D10. If the first transfer occurred, this succession of oscillations moves the other excited electrons to lower positions in the array (left in Table 3) to close the gap between excited electrons. This has the effect of moving the missing electron, electron state |0⟩, to the end (right in Table 3) of the quantum dots in state |1⟩. If the original transfer did not occur, then the succession of oscillations has no effect in transferring the subsequent excited electrons and the sequence corresponding to step 1 in Table 3 remains unaltered. After this succession of oscillations, the dots in array 424 are in a superposition of states as listed in the rows of Table 3 labeled step 1 and step 3. When a complete Rabi oscillation is performed between two quantum dots that both have excited electrons, a transfer is prohibited by energy conservation, a condition called the "electron turnstile effect." Thus the physics of quantum dots precludes a need for performing a separate logical step to determine whether the first transfer occurred, as is done in the optical source 320 described above.

The process is then repeated with a probability $P_2$ of transferring an excited electron to D4, a probability of $P_3$ of transferring an excited electron to D3, and so forth with probability $P_i$ given by Equation 15b, until all the terms in the superposition state given by Equation 2a have been generated. For example, if the measured basis state would be the sequence represented by j=2, then the quantum dots in array 424 would be measured in basis states as listed in the row of Table 3 labeled step 4.

In the illustrated embodiments, the superposition state of the array 424 of quantum dots is transferred to the array 423 of quantum dots. The array 423 is then operated to cause the excited electrons to emit photons onto the spatial modes 431, 433 for the x and y registers 412, 414 (or onto spatial modes 435, 437 for the x' and y' registers 412', 414'). Table 4 shows how the spatial modes 431, 433 transfer the j=2 sequence from the $x_D$ and $y_D$ registers, as listed the step 4 of Table 3, to the x and y registers.

TABLE 4

Example transfer of sequences of basis states from quantum dot array.

| destination register | x | x | x | x | x | y | y | y | y | y |
|---|---|---|---|---|---|---|---|---|---|---|
| destination position | 1 | 2 | 3 | 4 | 5 | 6 | 7 | 8 | 9 | 10 |
| transfer mode | 431a | 431b | 431c | 431d | 431e | 433a | 433b | 433c | 433d | 433e |
| Source array | 423 | 423 | 423 | 423 | 423 | 423 | 423 | 423 | 423 | 423 |
| source register | $x_D$ | $x_D$ | $x_D$ | $x_D$ | $x_D$ | $y_D$ | $y_D$ | $y_D$ | $y_D$ | $y_D$ |
| quantum dot | D5 | D4 | D3 | D2 | D1 | D10 | D9 | D8 | D7 | D6 |
| Sequence of states (j = 2) | 1 | 1 | 0 | 0 | 0 | 0 | 0 | 1 | 1 | 1 |

According to an embodiment for producing the joint entangled state of Equation 5, similar techniques are used to generate an entangled state in another one or two quantum dot arrays (not shown). The other quantum dot array includes $x_D'$ and $y_D'$ registers (not shown) for generating a sequence of states for the x' register 412' and y' register 414'. The distance between the $x_D$ and $x_D'$ registers is large compared to the separation of quantum dots within a register.

The factor of $(-1)^{jj'}$ is applied using the well known Coulomb interaction between electrons in the $x_D$ and $x_D'$ registers. The electrons in the $y_D'$ register and in the $y_D$ register are shielded with grounded conductors so that there are no coulomb interactions involving them. Unwanted Coulomb interactions among electrons within the $x_D$ register, itself, depend upon the value of j and are cancelled by applying an appropriate set of potentials to the associated U-gates, as can be discovered through experiment. Similarly, unwanted Coulomb interactions among electrons within the $x_D'$ register, itself, are cancelled by applying an appropriate set of potentials to the associated U-gates. The net electrostatic interaction between the $x_D$ and $x_D'$ registers is then proportional to the product of the sum of the charges in $x_D$ and $x_D'$, which is proportional to jj'. The factor $(-1)^{jj'}$ is applied by waiting for an appropriate time interval.

Thus, source 420 is a solid-state system that is used to efficiently generate a desired entangled state for transfer to ancilla photons used in high fidelity quantum operations in linear optic quantum computing.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for high fidelity quantum teleportation, comprising the steps of:
   receiving an input photon representing a particular quantum superposition state for logical values 0 and 1;
   generating a plurality of ancilla photons in a particular ancilla quantum state chosen to reduce a rate of error for obtaining a teleported photon below a threshold error rate;
   combining the plurality of ancilla photons with the input photon using one or more linear optical elements to populate a plurality of output channels;
   measuring a number of photons representing logical value 1 in a subset of the plurality of output channels;
   determining a particular output channel of the plurality of output channels based on the number of photons from said measuring step; and
   obtaining a teleported photon at the particular output channel in the quantum superposition state of the input photon with an error rate below the threshold error rate.

2. A method as recited in claim 1, wherein the threshold error rate is a rate of error of a probabilistic teleportation operation.

3. A method as recited in claim 1, wherein the threshold error rate is a threshold rate of error for a quantum error correction method.

4. A method as recited in claim 1, further comprising applying a phase correction to the photon in the particular output channel based on the number of photons from said measuring step.

5. A method as recited in claim 1, further comprising accepting the photon in the particular output channel without rejecting the photon in the particular output channel based on the number of photons from said measuring step.

6. A method as recited in claim 1, said step of generating a plurality of ancilla photons in the particular ancilla quantum state further comprising generating a number 2n of ancilla photons wherein:
   the particular ancilla quantum state is described by $\Sigma_{j=0,n} f(j)|1]^j|0]^{n-j}|0]^j|1]^{n-j}$;
   $|a]^b$ indicates b consecutive ancilla with a logical value a; and
   f(j) is not constant with changes in j.

7. A method as recited in claim 1, wherein a rate of error for obtaining the teleported photon is inversely proportional to a square of a number of ancilla photons in the plurality of ancilla photons.

8. A method as recited in claim 1, said step of generating the plurality of ancilla photons further comprising the steps of:
   producing photons in a plurality of on-demand photon generators corresponding to the plurality of ancilla photons based on the particular ancilla quantum state; and
   sending a demand to the plurality of on-demand photon generators to emit the photons as the plurality of ancilla photons.

9. A method as recited in claim 1, said step of generating the plurality of ancilla photons further comprising the steps of:
   in a plurality of quantum dots corresponding to the plurality of ancilla photons, producing an electron in an excited state for each ancilla photon to be produced with a logical value of 1;

positioning the electron in the excited state among the plurality of quantum dots based on the particular ancilla quantum state; and causing the excited electron in a quantum dot to emit a photon into a spatial mode corresponding to an ancilla photon of the plurality of ancillary photons.

10. A method for high fidelity quantum logic operations, comprising the steps of:

receiving a plurality of input photons representing a corresponding plurality of quantum superposition states for logical values 0 and 1;

generating a plurality of ancilla photons in a particular ancilla quantum state chosen to reduce, below a threshold error rate, a rate of error for obtaining an output of a logical operation;

combining the plurality of ancilla photons with the plurality of input photons using a linear optical element to populate a plurality of output channels;

measuring a number of photons representing logical value 1 in a first subset of the plurality of output channels;

determining a second subset of the plurality of output channels based on the number of photons from said measuring step; and obtaining a result of the logical operation as a plurality of photons on the second subset of the plurality of output channels with an error rate below the threshold error rate.

11. A method as recited in claim 10, wherein the threshold error rate is a rate of error of a probabilistic method for performing the logical operation.

12. A method as recited in claim 10, wherein the threshold error rate is a threshold rate of error for a quantum error correction method.

13. A method as recited in claim 10, further comprising applying a phase correction to a photon in the second subset of the plurality of output channels based on the number of photons from said measuring step.

14. A method as recited in claim 10, further comprising accepting the plurality of photons on the second subset without rejecting the plurality of photons on the second subset based on the number of photons from said measuring step.

15. A method as recited in claim 10, said step of generating a plurality of ancilla photons in the particular ancilla quantum state further comprising generating a number 4n of ancilla photons wherein:

the particular ancilla quantum state is described by $\Sigma_{j=0,n} f(j)|1\rangle^j|0\rangle^{n-j}|0\rangle^j|1\rangle^{n-j} \Sigma_{j'=0,n}(-1)^{jj'} f(j')|1\rangle^{j'}|0\rangle^{n-j'}|0\rangle^{j'}|1\rangle^{n-j'}$;

$|a\rangle^b$ indicates b consecutive ancilla with a logical value a; and f(j) is not constant with changes in j; and f(j') is not constant with changes in j'.

16. A method as recited in claim 10, wherein a rate of error for obtaining the teleported photon is inversely proportional to a square of a number of ancilla photons in the plurality of ancilla photons.

17. A method as recited in claim 10, said step of generating the plurality of ancilla photons further comprising the steps of:

producing photons in a plurality of on-demand photon generators corresponding to the plurality of ancilla photons based on the particular ancilla quantum state; and sending a demand to the plurality of on-demand photon generators to emit the photons as the plurality of ancilla photons.

18. A method as recited in claim 10, said step of generating the plurality of ancilla photons further comprising the steps of:

in a plurality of quantum dots corresponding to the plurality of ancilla photons, producing an electron in an excited state for each ancilla photon to be produced with a logical value of 1;

positioning the electron in the excited state among the plurality of quantum dots based on the particular ancilla quantum state; and causing the excited electron in a quantum dot to emit a photon into a spatial mode corresponding to an ancilla photon of the plurality of ancillary photons.

19. A device for high fidelity quantum teleportation using linear optics, comprising:

an input for receiving an input photon representing a particular quantum superposition state for logical values 0 and 1;

a source of a plurality of ancilla photons in a particular ancilla quantum state chosen to reduce, below a threshold error rate, a rate of error for obtaining a teleported photon;

a linear optical element for combining the ancilla photons with the input photon to populate a plurality of output channels;

a sensor to measure a number of photons representing logical value 1 in a subset of the plurality of output channels; and an output for receiving a teleported photon with an error rate below the threshold error rate on a particular output channel of the plurality of output channels based on the number of photons measured at the sensor.

20. A device for high fidelity quantum logic operations using linear optics, comprising:

an input for receiving a plurality of input photons representing a corresponding plurality of quantum superposition states for logical values 0 and 1;

a source of a plurality of ancilla photons in a particular ancilla quantum state chosen to reduce, below a threshold error rate, a rate of error for obtaining a result of a logical operation;

a linear optical element for combining the plurality of ancilla photons with the plurality of input photons to populate a plurality of output channels;

a sensor to measure a number of photons representing logical value 1 in a first subset of the plurality of output channels; and an output for receiving, on a second subset of the plurality of output channels based on the number of photons measured at the sensor, a plurality of photons representing a result of the logical operation with an error rate below the threshold error rate.

21. The device as recited in claim 20, for high fidelity controlled not operations, further comprising:

a first optical element for performing a Hadamard transform on a target input photon among the plurality of input photons; and a second optical element for performing a Hadamard transform on a target output photon among the second subset of the plurality of output channels.

* * * * *